(12) United States Patent
Hamada

(10) Patent No.: US 8,368,843 B2
(45) Date of Patent: Feb. 5, 2013

(54) BACKLIGHT UNIT AND LIQUID CRYSTAL DISPLAY DEVICE

(75) Inventor: Tetsuya Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 228 days.

(21) Appl. No.: 12/867,000

(22) PCT Filed: Nov. 4, 2008

(86) PCT No.: PCT/JP2008/070008
§ 371 (c)(1),
(2), (4) Date: Aug. 10, 2010

(87) PCT Pub. No.: WO2009/118942
PCT Pub. Date: Oct. 1, 2009

(65) Prior Publication Data
US 2011/0090422 A1    Apr. 21, 2011

(30) Foreign Application Priority Data
Mar. 28, 2008 (JP) .................................. 2008-087307

(51) Int. Cl.
*G02F 1/13357* (2006.01)
(52) U.S. Cl. ........................................ 349/65; 362/97.3
(58) Field of Classification Search .................. None
See application file for complete search history.

(56) References Cited

U.S. PATENT DOCUMENTS

| | | | | |
|---|---|---|---|---|
| 8,031,292 | B2* | 10/2011 | Chun et al. ...................... | 349/65 |
| 8,089,582 | B2* | 1/2012 | Sekiguchi et al. .............. | 349/65 |
| 2007/0133222 | A1 | 6/2007 | Watanabe et al. | |
| 2007/0165425 | A1 | 7/2007 | Sakamoto et al. | |
| 2007/0211191 | A1* | 9/2007 | Cho et al. ......................... | 349/58 |
| 2008/0049444 | A1* | 2/2008 | Hsiao et al. .................... | 362/611 |
| 2008/0186425 | A1* | 8/2008 | Chang et al. .................... | 349/58 |
| 2009/0116222 | A1* | 5/2009 | Hamada .......................... | 362/97.2 |
| 2010/0277670 | A1* | 11/2010 | Hamada .......................... | 349/62 |
| 2011/0025942 | A1* | 2/2011 | Lee ................................. | 349/58 |
| 2011/0170034 | A1* | 7/2011 | Jeong .............................. | 349/61 |

FOREIGN PATENT DOCUMENTS

| | | | |
|---|---|---|---|
| JP | 2006-11242 A | | 1/2006 |
| JP | 2007-12416 A | * | 1/2007 |
| JP | 2007-59216 A | | 3/2007 |
| JP | 2007-163620 A | | 6/2007 |
| JP | 2007-194067 A | | 8/2007 |
| JP | 2007-250273 A | | 9/2007 |
| JP | 2007-279593 A | | 10/2007 |
| JP | 2007-287339 A | | 11/2007 |
| WO | WO 2007/037037 A1 | * | 4/2007 |

* cited by examiner

*Primary Examiner* — Mike Stahl
(74) *Attorney, Agent, or Firm* — Birch, Stewart, Kolasch & Birch, LLP

(57) ABSTRACT

A housing (HG) for a backlight unit (49) includes a bottom section (22), a wall section (23) and a side section (VP), and the side section (VP) is at least a part of a first groove (DH1) which sandwiches a mounting substrate (11).

15 Claims, 27 Drawing Sheets

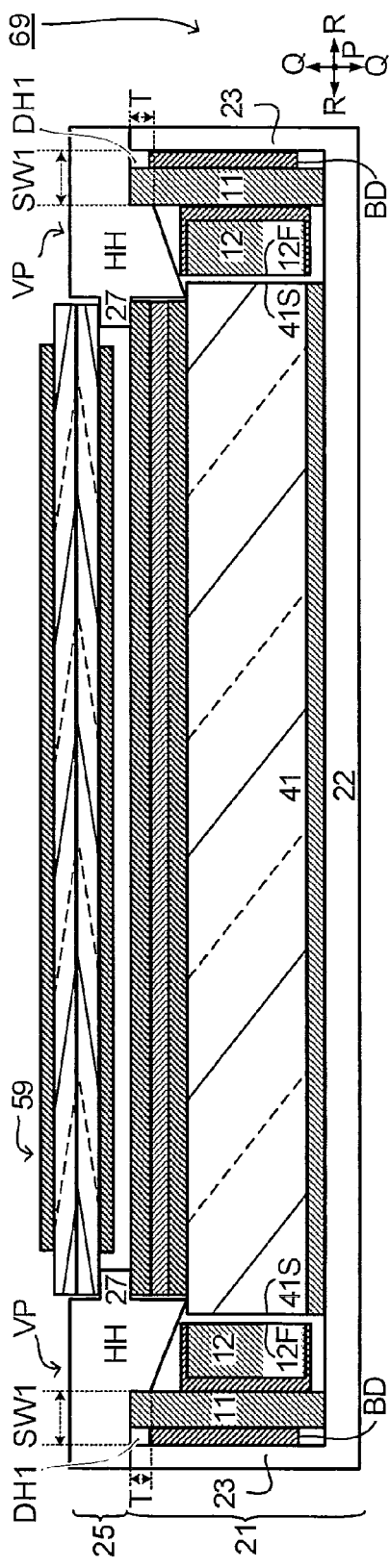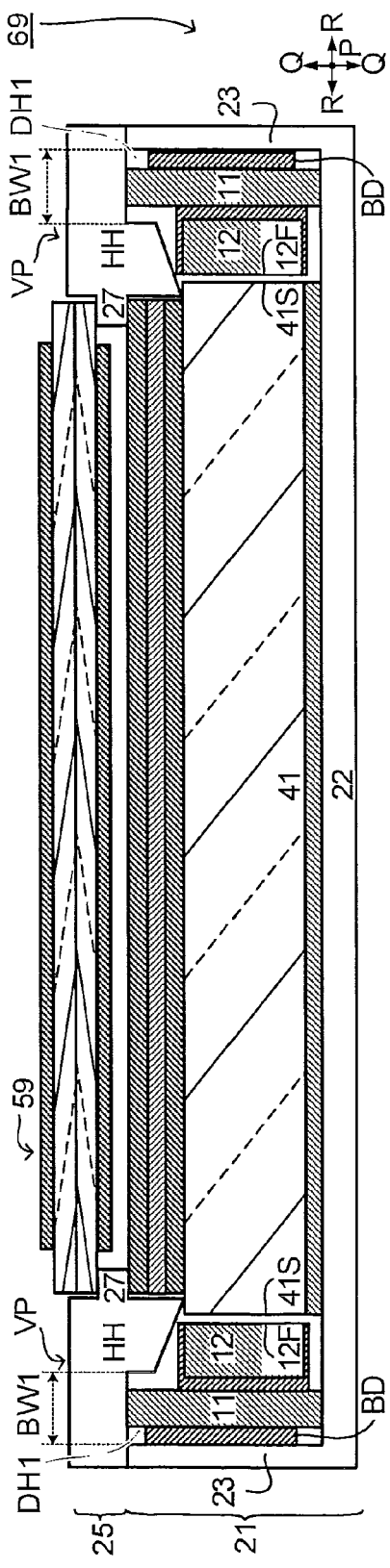

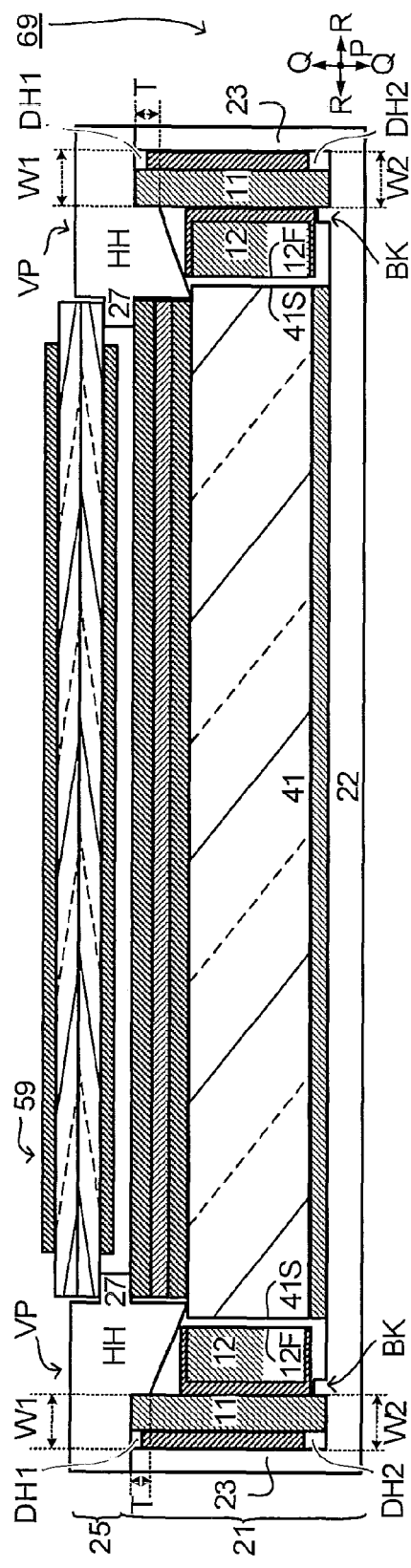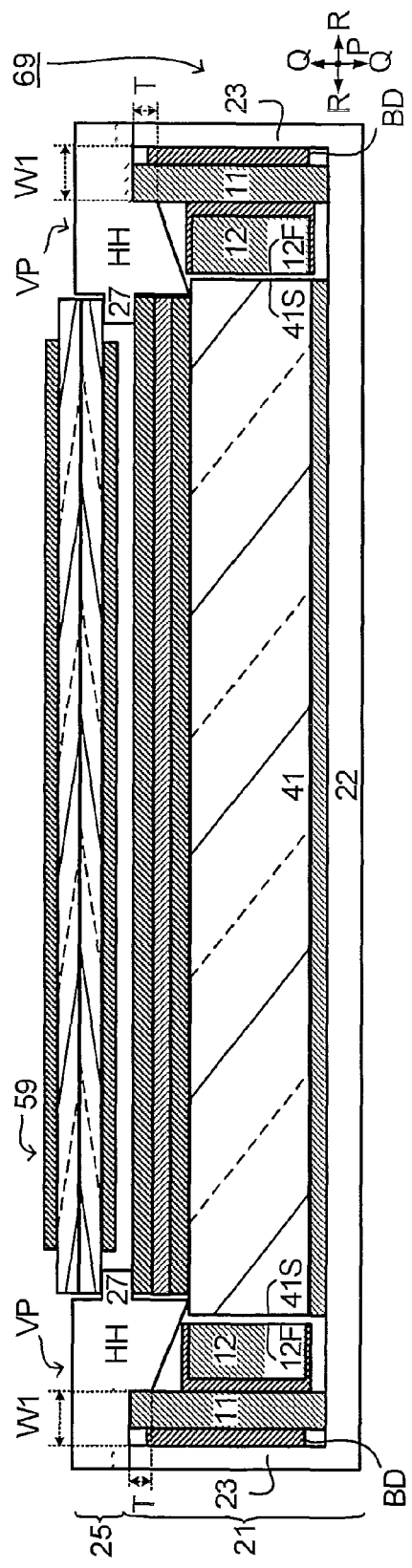

BACKLIGHT UNIT AND LIQUID CRYSTAL DISPLAY DEVICE

TECHNICAL FIELD

The present invention relates to a backlight unit including a mounting substrate on which a light emitting block is mounted, and a liquid crystal display device including the backlight unit.

BACKGROUND ART

There have conventionally been developed various types of backlight units for supplying light to a liquid crystal display panel (a non-light-emitting display panel). Backlight units typically include a light source that emits light. For example, the backlight unit 149 disclosed in Patent Document 1 has the LED (light emitting diode) 112 mounted on the mounting substrate 111 as shown in the sectional view of FIG. 25. The LED 112 emits light that enters the light guide plate 141 to travel toward the liquid crystal display panel 159 via the reflection sheet 142 and a group of optical sheets 146.

Such light is generated by driving the LED 112, but when the LED 112 is driven to generate light, heat is generated as well. The thus generated heat deteriorates the quality of the LED 112 (for example, the light emitting efficiency of the LED 112 is degraded or the life of the LED 112 is shortened). The heat of the LED 112 is also transferred to the mounting substrate 111, and the heat causes early deterioration or warp of the mounting substrate 111.

In order to prevent such defects caused by heat, in the backlight unit 149 described in Patent Document 1, the mounting substrate 111 on which the LED 112 is mounted is put in contact with the heat sink substrate 172 via the heat dissipation sheet 171. With this structure, heat of the LED 112 does not stay in the LED 112 or the mounting substrate 111 but escapes to the heat dissipation sheet 171 and to the heat sink substrate 172.

If the backlight unit 149 is used for a long time, however, the heat generated therein cannot be dealt with by heat dissipation merely by means of the heat dissipation sheet 171 and the heat sink substrate 172, and the mounting substrate 111 may, for example, warp in the worst case. To prevent this, in the backlight unit 149, the LED 112 and the mounting substrate 111 are placed between the light guide plate 141 and the heat sink substrate 172, and further, the mounting substrate 111 is placed between the housing 125 and the heat sink substrate 172 of the backlight unit 149.

The exploded perspective view of FIG. 26 and the sectional view of FIG. 27 show a backlight unit 149 as an example of backlight units other than that disclosed in Patent Document 1, and according to this backlight unit 149, it is possible to fasten a housing 121 and a mounting substrate 111 of the backlight unit 149 together with screws 173 (here, FIG. 27 is a sectional view taken along line a-a' in FIG. 26, and a liquid crystal display panel 159 is additionally illustrated therein). Patent Document 1: JP-A-2006-11242

DISCLOSURE OF THE INVENTION

Problems to be Solved by the Invention

However, with the backlight unit 149 disclosed in Patent Document 1, the light emission surface of the LED 112 needs to be in close contact with a side surface of the light guide plate 141 in order to prevent defects from being caused by heat. This limits the possibilities in designing the product. For example, this makes it impossible to design such that a light emission surface of the LED 112 is positioned away from a side surface of the light guide plate 141 in order to reduce nonuniformity in light amount occurring in light (backlight light) coming from the backlight unit 149.

Furthermore, with the backlight unit 149 as shown in FIGS. 26 and 27, tap processing (to form a screw hole 174) needs to be applied to a mounting substrate 111 including wiring of electrodes and the like for the LED 112. In particular, if the screw 173 is made of a conductive material such as metal, the cost of the tap processing will be excessively high to ensure leakage prevention.

The present invention has been made in view of the foregoing. An object of the present invention is to provide a backlight unit in which LEDs are arranged with a higher degree of freedom and that is manufactured easily at low cost, and a liquid crystal display device including the backlight unit.

Means for Solving the Problem

A backlight unit includes: a light emitting block; a mounting substrate on which the light emitting block is mounted; a light guide plate that receives light coming from the light emitting block, the light guide plate allowing the light to pass therethrough and guiding the light to an outside thereof; and a housing in which the light emitting block, the mounting substrate, and the light guide plate are housed.

Here, the housing includes: a bottom section that supports the light guide plate; a wall section that rises from the bottom section; and a protrusion section that is supported by the wall section, protrudes toward the bottom section, and extends in a direction that intersects a direction in which the wall section rises. And the protrusion section is at least part of a first groove in which the mounting substrate is held.

With this structure, the comparatively thick protrusion section holds the mounting substrate in the first groove. As a result, the light emitting block is positioned as desired to be immovable with respect to the light guide plate. Thus, a higher degree of freedom is allowed in the arrangement of the light emitting block (for example, it is unnecessary for the light emitting block to be pressed by a side surface of the light guide plate for the purpose of making the light emitting block immovable with respect to the light guide plate).

Furthermore, since the first groove at least includes the thick protrusion section, it is easy to change the position of the first groove (that is, the first groove can be formed at various locations in the protrusion section). Thus, a higher degree of freedom is securely allowed in the arrangement of the light emitting block.

Moreover, heat resulting from the operation of the light emitting block, the heat typically tending to stay in the light emitting block itself and the mounting substrate, escapes via the first groove (and thus via the protrusion section).

For example, if one of opposite inner surfaces of the first groove that face each other is formed of the protrusion section and another one of the opposite inner surfaces of the first groove is formed of the wall section, heat that tends to stay in the light emitting block itself and the mounting substrate escapes to the protrusion section and to the wall section that form the first groove.

It is desirable that one of the first groove be formed for one of the mounting substrate (this is not meant as a limitation to the present invention). The groove width of the first groove may be either uniform or nonuniform. For example, there may exist along a length of the first groove, a first narrow groove width at which the first groove is in close contact with both a mounting surface and a non-mounting surface of the mounting substrate, and a first wide groove width that is wider than the first narrow groove width.

The first groove whose groove width is not uniform is also capable of holding the mounting substrate therein. Besides, material cost of the protrusion section can be reduced thanks to the wider groove width, and thus backlight cost can also be reduced.

It is desirable that portions of the first groove having the first narrow groove width be positioned corresponding at least to a middle portion and two end portions of the mounting substrate along a length of the mounting substrate. This is because, with this structure, the mounting substrate is efficiently held along its length direction.

A desirable example of a case in which a plurality of grooves are formed as the first groove with respect to one mounting substrate is as follows. That is, a plurality of first grooves each having a length shorter than the length of the mounting substrate are formed with respect to one mounting substrate, and located corresponding at least to a middle portion and two end portions of the mounting substrate along the length of the mounting substrate.

With this structure, not only the mounting substrate is efficiently held along its length, but also the backlight cost is reduced as a result of the length of the first groove being shorter than the length of the mounting substrate.

It is desirable that the protrusion section include a reflection surface that reflects light, and that a space is formed to face at least three surfaces of the reflection surface, a light emission surface of the light emitting block, and a light reception surface of the light guide plate. This is because, with this structure, light travels around inside the space, and this makes it easier for the light to enter the light guide plate.

For example, if the angle formed by the light emission surface of the light emitting block and the reflection surface is an acute angle, and the angle formed by the light reception surface of the light guide plate and the reflection surface is an obtuse angle, when light coming from the light emitting block reaches the reflection surface, the light is reflected thereon to reach an incident surface of the light guide plate.

It is desirable that an optical sheet that transmits light be placed so as to cover the light guide plate, and that the optical sheet be held by the protrusion section. This structure contributes to effective use of the comparatively thick protrusion section.

Even more effective use of the protrusion section can be made if a support portion is formed in the protrusion section so as to support a liquid crystal display panel that receives light from the optical sheet.

The mounting substrate is not limited to be held only in the first groove. That is, the mounting substrate may be held in another groove (a second groove) as well. For example, it is desirable that at least part of the second groove in which the mounting substrate is held be the bottom section of the housing.

With this structure, the mounting substrate is held in the first groove of the protrusion section and the second groove of the bottom section, and thus the mounting substrate is stably housed in the housing.

If one of opposite inner surfaces of the second groove that face each other is formed of the bottom section and another one of the opposite inner surfaces of the second groove is formed of the wall section, heat that tends to stay in the light emitting block itself and the mounting substrate escapes to the bottom section and the wall section that form the second groove.

It is desirable that one of the second groove be formed for one of the mounting substrate (this is not meant as a limitation to the present invention). The groove width of the second groove may be either uniform or nonuniform. For example, there may exist along a length of the second groove, a second narrow groove width at which the second groove is in close contact with both a mounting surface and a non-mounting surface of the mounting substrate, and a second wide groove width that is wider than the second narrow groove width.

The second groove whose groove width is not uniform is also capable of holding the mounting substrate therein. Besides, material cost of the protrusion section can be reduced thanks to the wider groove width, and thus backlight cost can also be reduced.

It is desirable that portions of the second groove having the second narrow groove width be positioned corresponding at least to a middle portion and two end portions of the mounting substrate along a length of the mounting substrate. This is because, with this structure, the mounting substrate is efficiently held along its length direction.

A desirable example of a case in which a plurality of grooves are formed as the second groove with respect to one mounting substrate is as follows. That is, a plurality of second grooves each having a length shorter than the length of the mounting substrate are formed with respect to one mounting substrate, and located corresponding at least to a middle portion and two end portions of the mounting substrate along the length of the mounting substrate.

With this structure, not only the mounting substrate is efficiently held along its length but also the backlight cost is reduced as a result of the length of the second groove being shorter than the length of the mounting substrate.

It can be said that the present invention includes a liquid crystal display device that is provided with any of the backlight units described above and a liquid crystal display panel that receives light from the backlight unit. Also, in such a liquid crystal display device, it is desirable that the liquid crystal display panel be supported by a support portion formed in the protrusion section. That is, in the liquid crystal display device, an optical sheet that transmits light is placed so as to cover the light guide plate, the optical sheet is held by the protrusion section, and the liquid crystal display panel that receives light coming from the optical sheet is supported by the support portion formed in the protrusion section.

Advantages of the Invention

According to the present invention, since the first groove is formed by using the comparatively thick protrusion section, the position of the first groove can be changed as necessary. This allows a higher degree of freedom in the positioning of the mounting substrate that is held in the first groove, and thus in the positioning of the light emitting block.

BRIEF DESCRIPTION OF DRAWINGS

FIG. 6A is a sectional view of a liquid crystal display device different from that shown in FIG. 3, taken along the sectional direction indicated by line A2-A2' and viewed as indicated by the arrows in FIG. 4 and FIG. 5;

FIG. 6B is a sectional view of a liquid crystal display device different from that shown in FIG. 3, taken along the sectional direction indicated by line B2-B2' and viewed as indicated by the arrows in FIG. 4 and FIG. 5;

FIG. 18A is a sectional view of a liquid crystal display device different from those shown in FIG. 3, FIGS. 6A/6B, FIGS. 9A/9B, FIG. 12, FIGS. 14A/14B and FIG. 16, taken along the sectional line indicated by line A7-A7' and viewed as indicated by the arrows shown in FIG. 17;

FIG. 18B is a sectional view of a liquid crystal display device different from those shown in FIG. 3, FIGS. 6A/6B, FIGS. 9A/9B, FIG. 12, FIGS. 14A/14B and FIG. 16, taken along the sectional line indicated by line B7-B7' and viewed as indicated by the arrows shown in FIG. 17;

LIST OF REFERENCE SYMBOLS

Figure 1:
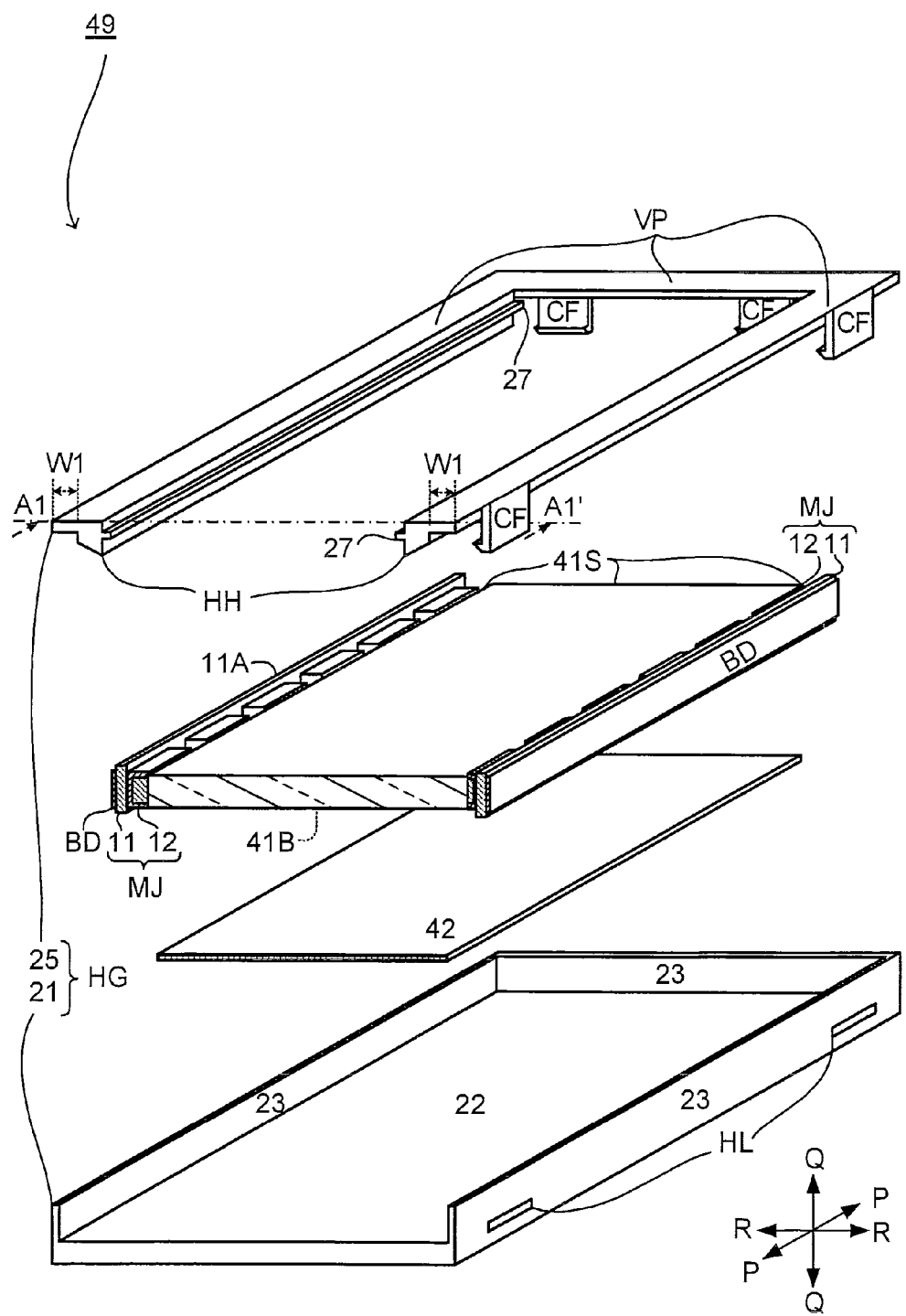
FIG. 1 is an exploded perspective view of a backlight unit.

MJ LED module
11 mounting substrate
11A mounting surface
11B non-mounting surface
12 LED (light emitting diode)
BD bonding member
HG housing
21 bottom housing member
22 bottom section
23 wall section
25 top housing member
VP side section
HH protrusion section
27 projection (support portion)
DH1 first groove
DH2 second groove
DD2 level difference
DH3 third groove
DD3 level difference
41 light guide plate
42 reflection sheet
43 diffusion sheet
44 optical sheet
45 optical sheet
49 backlight unit
59 liquid crystal display panel
69 liquid crystal display device

BEST MODE FOR CARRYING OUT THE INVENTION

Hereinafter, embodiments of the present invention will be described with reference to the drawings. Hatching, reference signs for members, etc. may sometimes be omitted in a drawing for ease of description, and in such a case, a different drawing is to be referred to. A black dot in a drawing indicates a direction perpendicular to the sheet on which the drawing is drawn.

Figure 24:
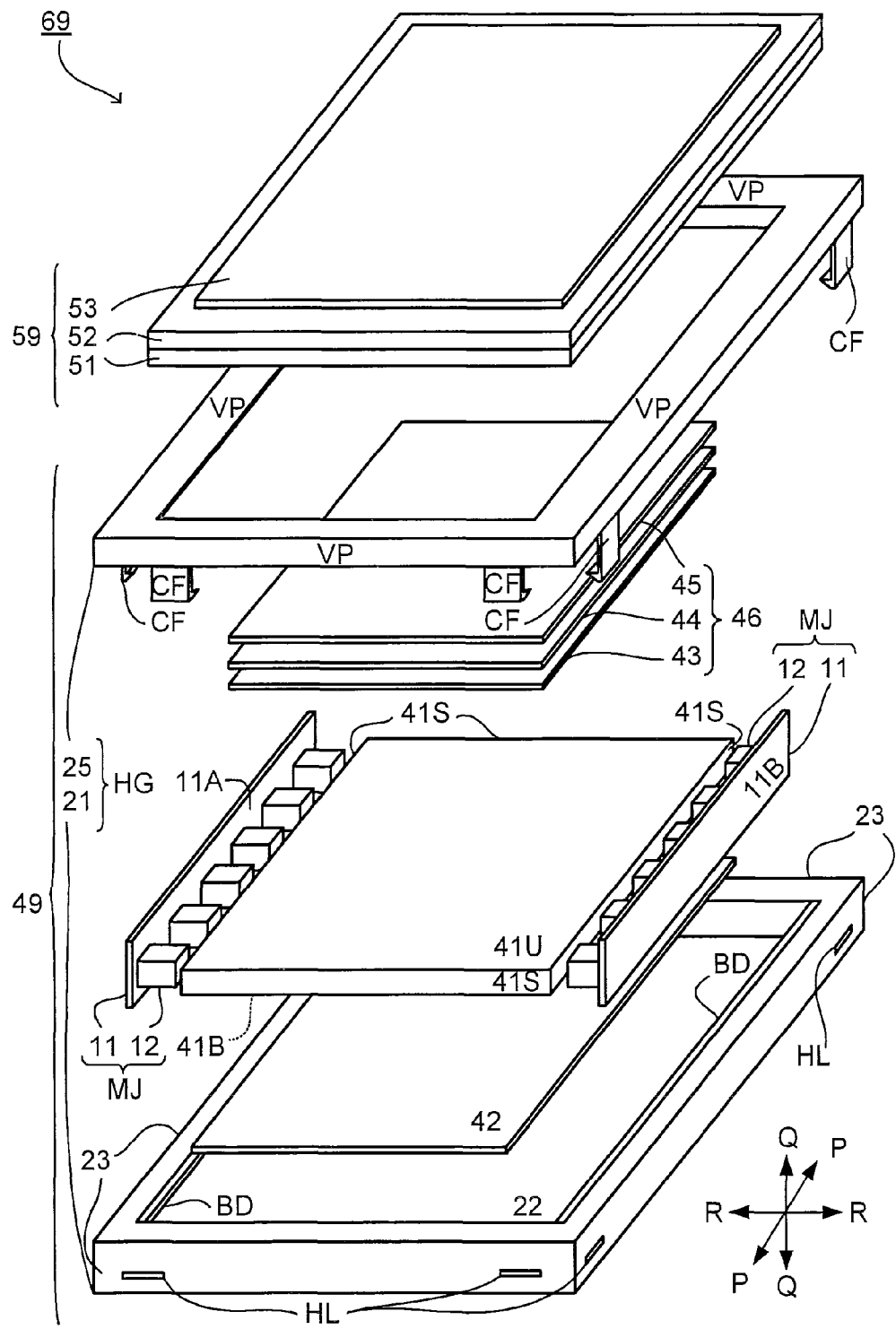
FIG. 24 is an exploded perspective view of a liquid crystal display device.
Figure 25:
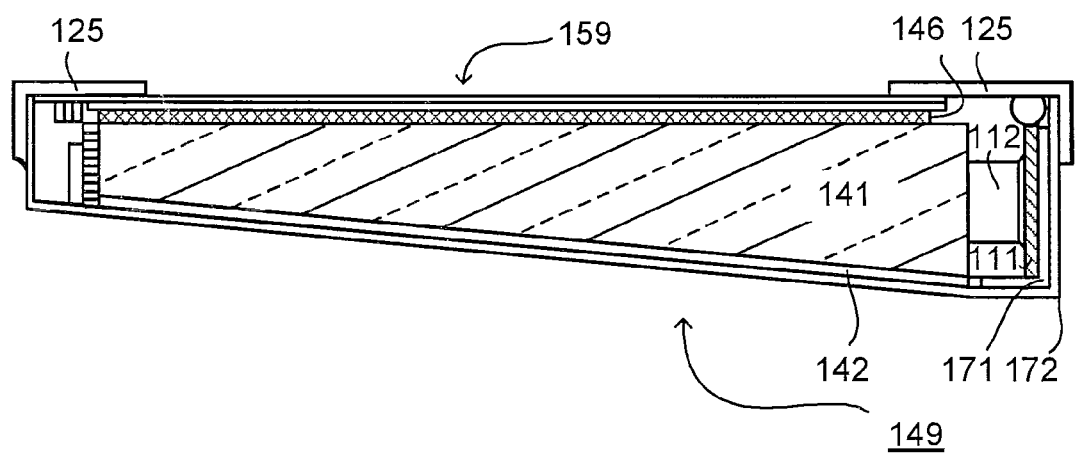
FIG. 25 is a sectional view of a conventional liquid crystal display device.
Figure 26:
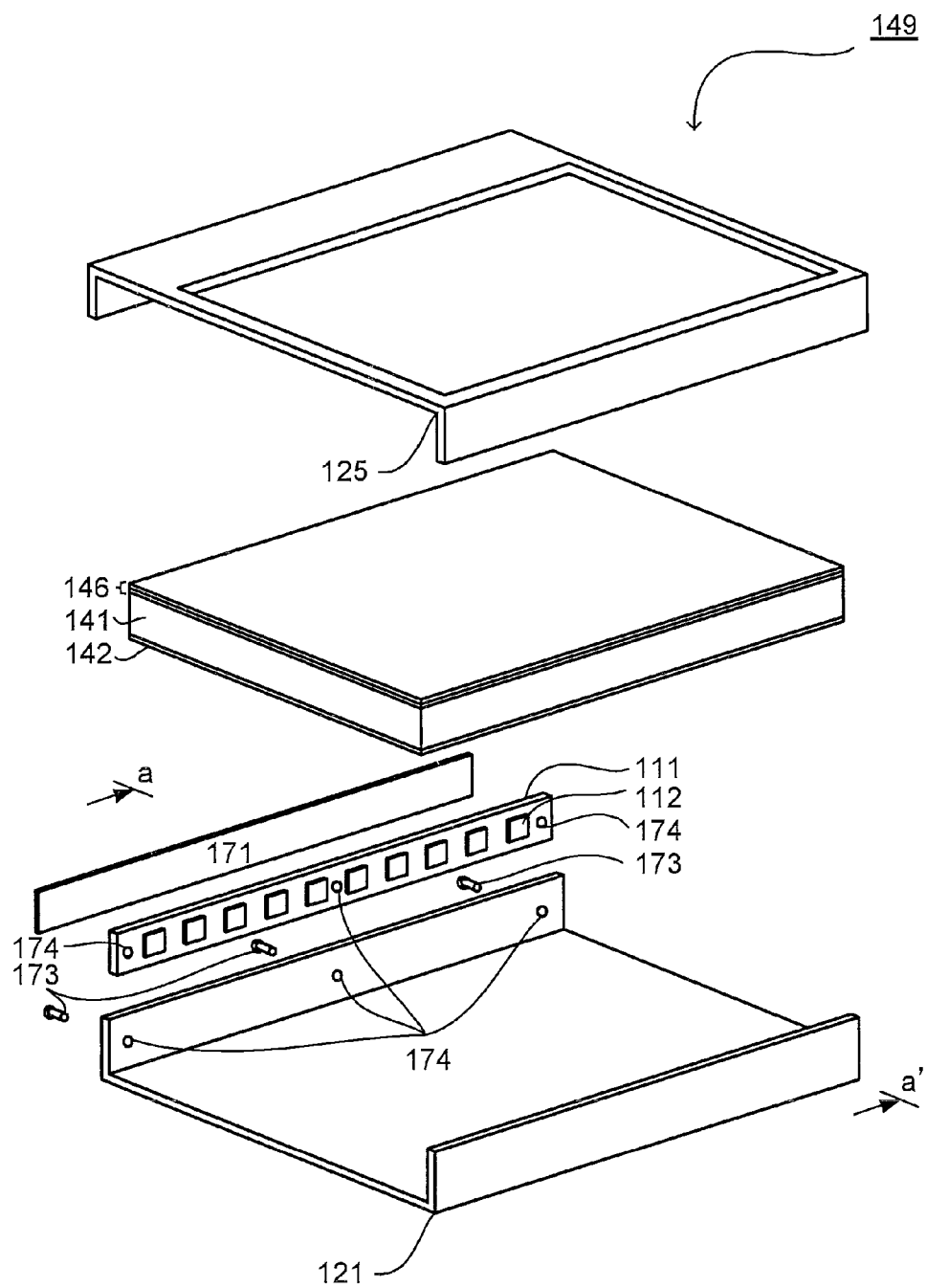
FIG. 26 is an exploded perspective view of a conventional backlight unit different from that shown in FIG. 25.
Figure 27:
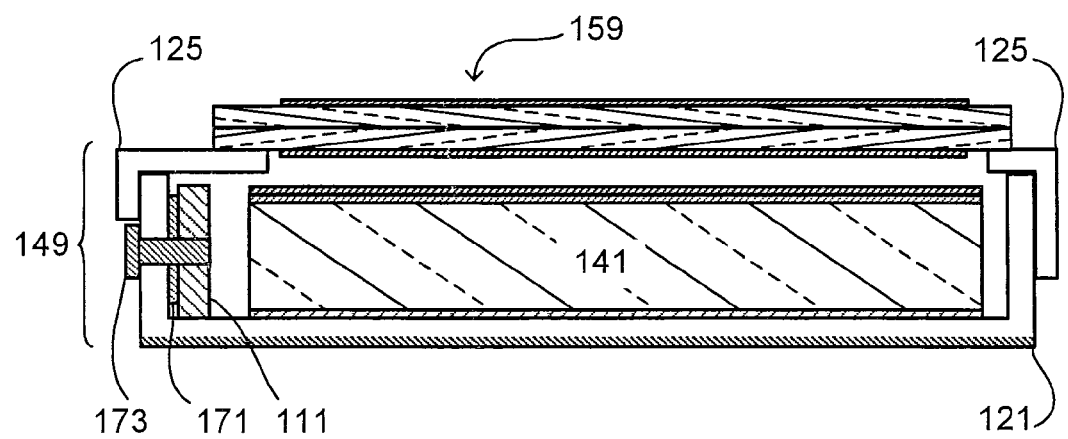
FIG. 27 is a sectional view of a liquid crystal display device including the backlight unit shown in FIG. 26 (taken along the sectional direction indicated by line a-a' and viewed as indicated by the arrows in FIG. 26).

FIG. 24 is an exploded perspective view of a liquid crystal display device 69. As shown in FIG. 24, the liquid crystal display device 69 includes a liquid crystal display panel 59 and a backlight unit 49.

The liquid crystal display panel 59 is formed by bonding together an active matrix substrate 51 including a switch element such as a TFT (thin film transistor) and a counter substrate 52 facing the active matrix substrate 51 by using a sealing member (not shown). Liquid crystal (not shown) is charged in the gap between the substrates 51 and 52 (here, deflection films 53, 53 are attached so as to sandwich the active matrix substrate 51 and the counter substrate 52).

The liquid crystal display panel 59, which is a non-light-emitting display panel, exerts its display function by receiving light (backlight light) from the backlight unit 49. Accordingly, the display quality of the liquid crystal display panel 59 can be improved by uniform irradiation of light coming from the backlight unit 49 over the entire surface of the liquid crystal display panel 59.

The backlight unit 49 includes, for the purpose of generating backlight light, an LED module (a light source module) MJ, a light guide plate 41, a reflection sheet 42, a diffusion sheet 43, optical sheets 44 and 45, and a housing HG.

The LED module MJ is a light emitting module, including: a mounting substrate 11; and an LED (light emitting diode) 12 that emits light by being supplied with electric current via an electrode formed on a mounting surface 11A of the mounting substrate 11 and on which the LED 12 is mounted (incidentally, a surface of the mounting substrate 11 on which the LED 12 is not mounted will be referred to as a non-mounting surface 11B).

It is desirable that an LED module MJ include a plurality of LEDs (light emitting blocks, point light sources) 12. Furthermore, it is desirable that the LEDs 12 be aligned parallel to each other in a row. However, only part of the LEDs 12 are illustrated in the figure for ease of illustration (incidentally, the direction along which the LEDs 12 are aligned will be referred to as "alignment direction P").

The light guide plate 41 is a plate member that has side surfaces 41S and a top and bottom surfaces 41U and 41B, the top and bottom surfaces 41U and 41B being positioned to sandwich the side surfaces 41S. A surface (a light reception surface) among the side surfaces 41S faces light emission surfaces of the LEDs 12, and thus receives light from the LEDs 12. The received light is subjected to mixing inside the light guide plate 41, to be emitted out from the top surface 41U as surface light.

The reflection sheet 42 is placed so as to be covered with the light guide plate 41. A surface of the reflection sheet 42 that faces the bottom surface 41B of the light guide plate 41 functions as a reflection surface. Thus, the reflection surface reflects light from the LEDs 12 and light transmitted in the light guide plate 41 back to the light guide plate 41 (specifically, through the bottom surface 41B of the light guide plate 41) without allowing light to leak out.

The diffusion sheet 43 is placed so as to cover the top surface 41U of the light guide plate 41, and diffuses surface light coming from the light guide plate 41 to deliver light all over the liquid crystal display panel 59 (incidentally, the diffusion sheet 43 and the optical sheets 44 and 45 will hereinafter be collectively referred to as an optical sheet group 46 as well).

The optical sheets 44 and 45, each of which has a prism-like surface, are optical sheets that deflect light radiation characteristics, and they are placed so as to cover the diffusion sheet 43. Thus, the optical sheets 44 and 45 collect light coming from the diffusion sheet 43, and thereby increase brightness. Incidentally, the optical sheets 44 and 45 are arranged such that directions in which they disperse light that they have collected cross each other.

The housing HG includes: a box-shaped bottom housing member 21 having a bottom section 22; and a top housing member 25 that covers the bottom housing member 21 as if a lid. The bottom housing member 21 houses therein the LED module MJ, the light guide plate 41, the reflection sheet 42, the diffusion sheet 43, the optical sheets 44 and 45, and the like.

Specifically, the reflection sheet 42, the light guide plate 41, the diffusion sheet 43, and the optical sheets 44 and 45 are stacked in this order, and housed in the bottom housing member 21 (hereinafter, the direction along which these members are stacked will be referred to as "stacking direction Q", and a direction perpendicular to both the alignment direction P of the LEDs 12 and the stacking direction Q will be referred to as "direction R").

The non-mounting surface 11B of the mounting substrate 11 is attached to an inner surface of a wall section 23 of the bottom housing member 21 via a bonding member BD (incidentally, the mounting substrate 11 and the wall section 23 may be in direct contact with each other with no bonding member BD interposed in between). That is, the LED module MJ is attached to the bottom housing member 21 via the bonding member BD.

And, if the bottom housing member 21 is formed of a highly heat conductive material (heat dissipating material), heat generated during the operation of the LEDs 12 does not stay in the LEDs 12 themselves or in the mounting substrate 11, but escapes to the bottom housing member 21 via the bonding member BD (it is more preferable that the bonding member BD is also highly heat conductive).

In the backlight unit 49, light from the LEDs 12 enters the light guide plate 41 to be emitted therefrom as surface light, and the surface light passes through the optical sheet group 46 to be emitted as backlight light having enhanced brightness. The backlight light reaches the liquid crystal display panel 59, on which an image is displayed by use of the backlight light.

Figure 2:
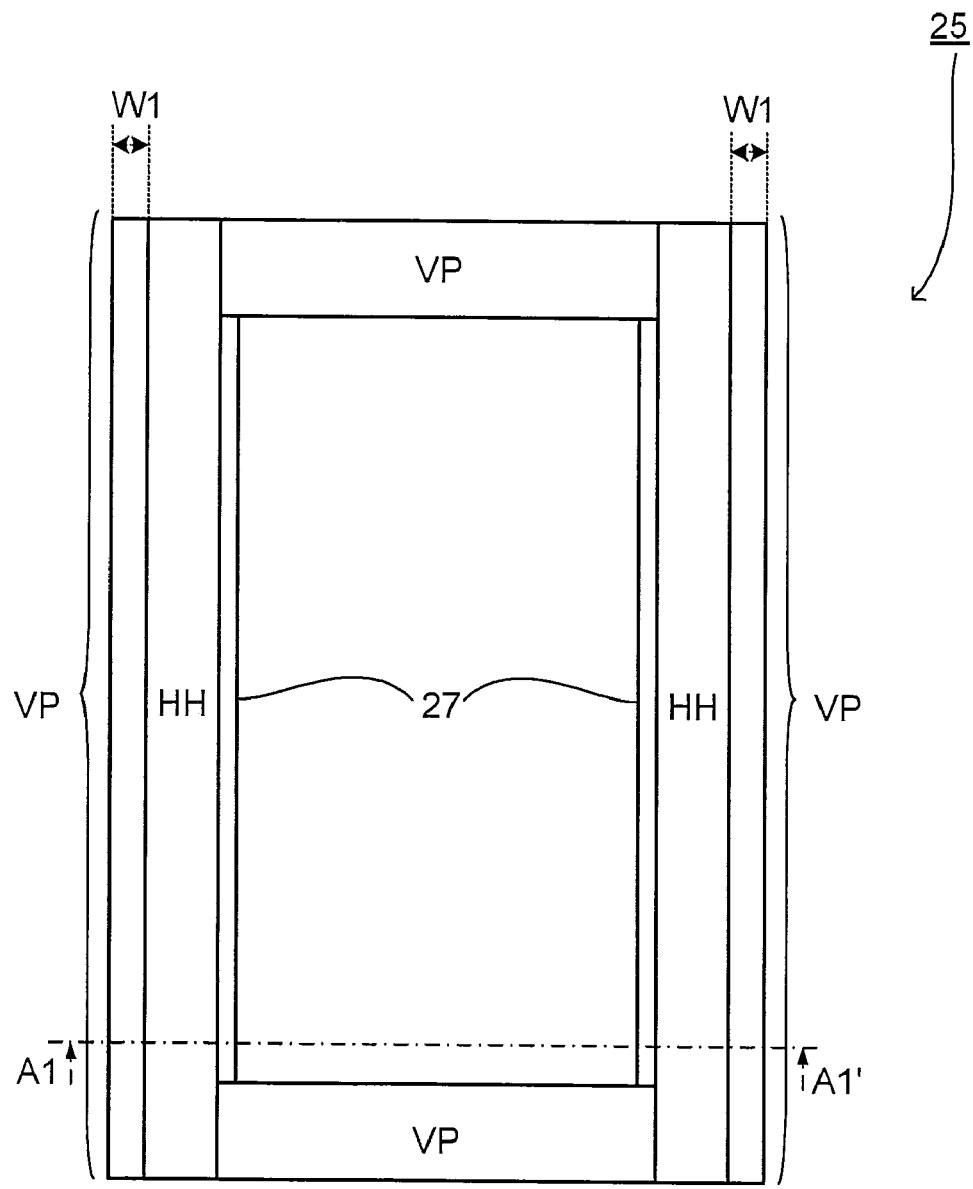
FIG. 2 is a plan view of a top housing member.
Figure 3:
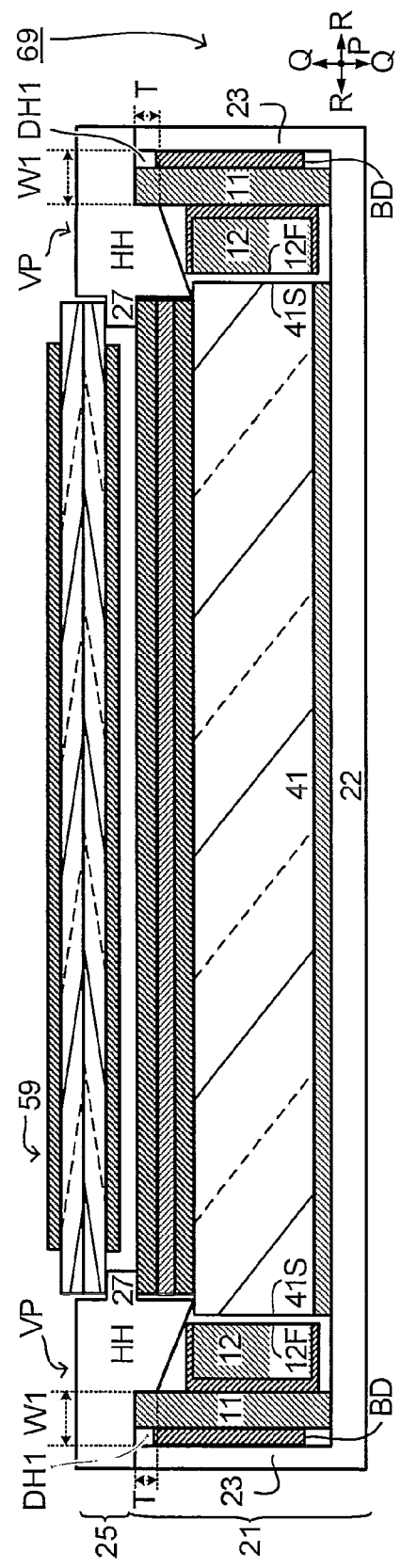
FIG. 3 is a sectional view of a liquid crystal display device (taken along the sectional direction indicated by line A1-A1' and viewed as indicated by the arrows shown in FIGS. 1 and 2)

Now, a detailed description will be given of the housing HG of the backlight unit 49, with reference to FIGS. 1 to 3. FIG. 1 is an exploded perspective view of the backlight unit 49 (here, the optical sheet group 46 is omitted, and the hatching indicates a cross section). FIG. 2 is a plan view of the top housing member 25. FIG. 3 is a sectional view of the liquid crystal display device 69 (taken along a sectional direction indicated by line A1-A1' and viewed as indicated by the arrows shown in FIGS. 1 and 2).

The bottom housing member 21 includes the bottom section 22 and the wall section 23. The bottom section 22 is a member that supports the light guide plate 41 and the like, and the circumference of the bottom section 22 is slightly larger than that of the light guide plate 41.

The wall section 23 rises from the bottom section 22, surrounding the bottom section 22 (it is preferable that the wall section 23 rises from the bottom section 22 in the stacking direction Q). And, an LED module MJ is attached to part of the wall section 23 (for example, to each of opposite sides of the wall section 23 that face each other) via a bonding member BD.

In the figure, the non-mounting surface 11B of a mounting substrate 11 is in indirect contact with the wall section 23 with a bonding member BD interposed in between, but this is not meant to limit the present invention. For example, the non-mounting surface 11B of a mounting substrate 11 may be in direct contact with the wall section 23 (the following description, however, will deal with an example in which the wall section 23 and a mounting substrate 11 are in indirect contact with each other with a bonding member BD interposed in between).

The top housing member 25 is a frame-like member having an outline similar to that of the bottom section 22 of the bottom housing member 21, and the top housing member 25 is placed so as to cover the bottom housing member 21. Thus, it may be said that the top housing member 25 is a lid of the bottom housing member 21.

The top housing member 25 is also provided with engagement claws CF to be engaged in engagement holes HL of the bottom housing member 21. When the top housing member 25 is placed to cover the bottom housing member 21, the engagement claws CF are fitted into the engagement holes HL (see FIG. 1). Thereby, the top housing member 25 is immovably fixed to the bottom housing member 21 (the top and bottom housing members 21 and 25 are coupled together).

Furthermore, as shown in FIG. 2 (a plan view showing inside of the top housing member 25), a side section VP of the top housing member 25 that forms sides of the frame has a width extending toward the inside of the frame. Thus, when the top housing member 25 is attached to the bottom housing member 21, the side section VP extends (is wide) in directions crossing the direction in which the wall section 23 rises.

Moreover, when the top housing member 25 is attached to the bottom housing member 21, two portions of the side section VP that are each positioned to overlap an LED module MJ are formed thick toward the bottom section 22 of the bottom housing member 21 to face the wall section 23 (see FIG. 3). That is, the two portions (protrusion sections) of the side section VP are each a member having a given width and a comparatively large thickness (wall thickness).

Here, as shown in FIGS. 1 to 3, the protrusion sections (hill sections HH) are each a given distance away from an edge of the side section VP and extend in a longitudinal direction of the side section VP, edges of the side section VP serving as external edges of the frame as well. With this structure, if the wall section 23 is positioned to support the edges of the side section VP when the top housing member 25 is attached to the bottom housing member 21, first grooves DH1 are formed one between each of the hill sections HH and the wall section 23 (that is, the side section VP is at least part of the first grooves DH1).

A first groove DH1 has a first groove width W1 that is wide enough for a mounting substrate 11 and a bonding member BD to be held therein. That is, an interval between inner surfaces (that is, an interval between a hill section HH of the side section VP and the wall section 23 of the bottom housing member 21) in a first groove DH 1 has a length of the same order as the sum of the thickness of a mounting substrate 11 and the thickness of a bonding member BD.

Moreover, as shown in FIG. 3, when the top housing member 25 is attached to the bottom housing member 21, a hill section HH is so thick as to be able to reach a mounting substrate 11 attached to the wall section 23 of the bottom housing member 21. That is, a first groove DH1 has a groove width W1 and a groove height (a groove depth T) that permit a mounting substrate 11 attached to the wall section 23 to be held therein.

Thus, when the top housing member 25 is attached to the bottom housing member 21 having the LED modules MJ attached to its wall section 23 with the bonding members BD interposed in between, a mounting substrate 11 located between the side section VP of the top housing member 25 and the wall section 23 is held in a first groove DH1 formed with the wall section 23 and the side section VP.

With this structure, the LEDs 12 do not have to be pressed by, for example, a side surface 41s (in other words, the light emission surfaces 12F of the LEDs 12 and the side surfaces 41S of the light guide plate 41 do not need to be in close contact with each other) to prevent the LED modules MJ from moving. Thus, a higher degree of freedom is allowed in the arrangement of the LEDs 12.

Furthermore, since a first groove DH1 at least includes a thick-walled portion of the side section VP, it is easy to change the position of a first groove DH1. That is, the position and the shape of a first groove DH1 can be changed by changing the shape of a hill section HH (thus making effective use of a comparatively thick-walled portion of the side section VP). Thus, a much higher degree of freedom is securely allowed in the arrangement of the LEDs 12.

Moreover, even if the bonding force of a bonding member BD is reduced due to, for example, a long-term use, to cause a mounting substrate 11 to warp so much away from the bonding member BD that the mounting substrate 11 tends to come off from the wall portion 23 of the bottom housing member 21, the mounting substrate 11 is pressed against the wall section 23 by a hill section HH that forms the inner surface of the first groove DH1. Then, heat in the LEDs 12 and the mounting substrate 11 securely escapes to the bottom housing member 21 (and to the hill section HH as well). This prevents deterioration of the LEDs 12 from being caused by heat, making long-time driving of the LEDs 12 possible. This also helps make deterioration of the mounting substrate 11 less likely to be caused by heat.

Moreover, if the top housing member 25 including the hill sections HH and the bottom housing member 21 including the wall section 23 are both made of resin (insulating material), the inner surface of a first groove DH1 is also made of resin (that is, one part of the inner surface of a first groove DH1 is formed of the side section VP and the other part thereof is formed of the wall section 23). Thus, the height T (the groove depth T) of the portion of a hill section HH that is in contact with a mounting surface 11A on which a conductive wiring is formed may be increased, and this makes it easier to increase the area of the portion of the inner surface formed of the hill section HH. Thus, a mounting substrate 11 is securely pressed against the wall section 23 of the bottom housing member 21.

As shown in FIG. 3, the opposite inner surfaces of a first groove DH1 that face each other are formed of a hill section HH (the side section VP) and of the wall section 23, respectively. However, this is not meant to limit the present invention. For example, a groove in which a mounting substrate 11 is to be held may be carved in a hill section HH of the side section VP (that is, a first groove DH1 may be entirely formed of the side section VP). However, if a first groove DH1 is formed of a hill section HH and the wall section 23 as shown in FIG. 3, there is no need of performing processing such as carving a groove in a hill section HH of the side section VP.

As shown in FIGS. 1 to 3, the groove width W1 of a first groove DH1 is uniform along the length thereof, and the groove width W1 has a length of the same order as the sum of the thickness of a mounting substrate 11 and the thickness of a bonding member BD such that a mounting substrate 11 can be held in a first groove DH1. However, a first groove DH1 may be formed otherwise, and one such example will be described with reference to FIGS. 4 to 6.

Figure 4:
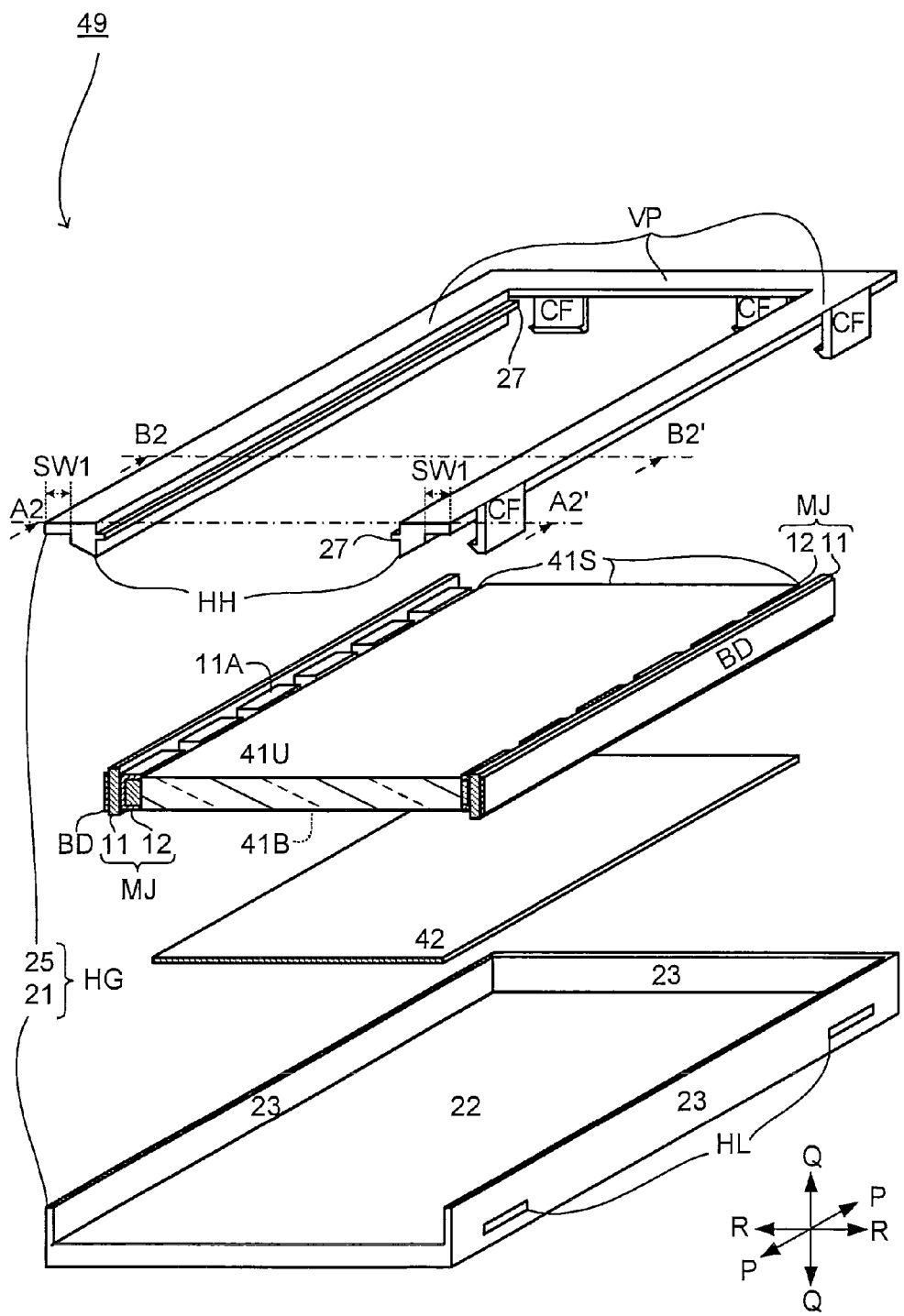
FIG. 4 is an exploded perspective view of a backlight unit different from that shown in FIG. 1.
Figure 5:
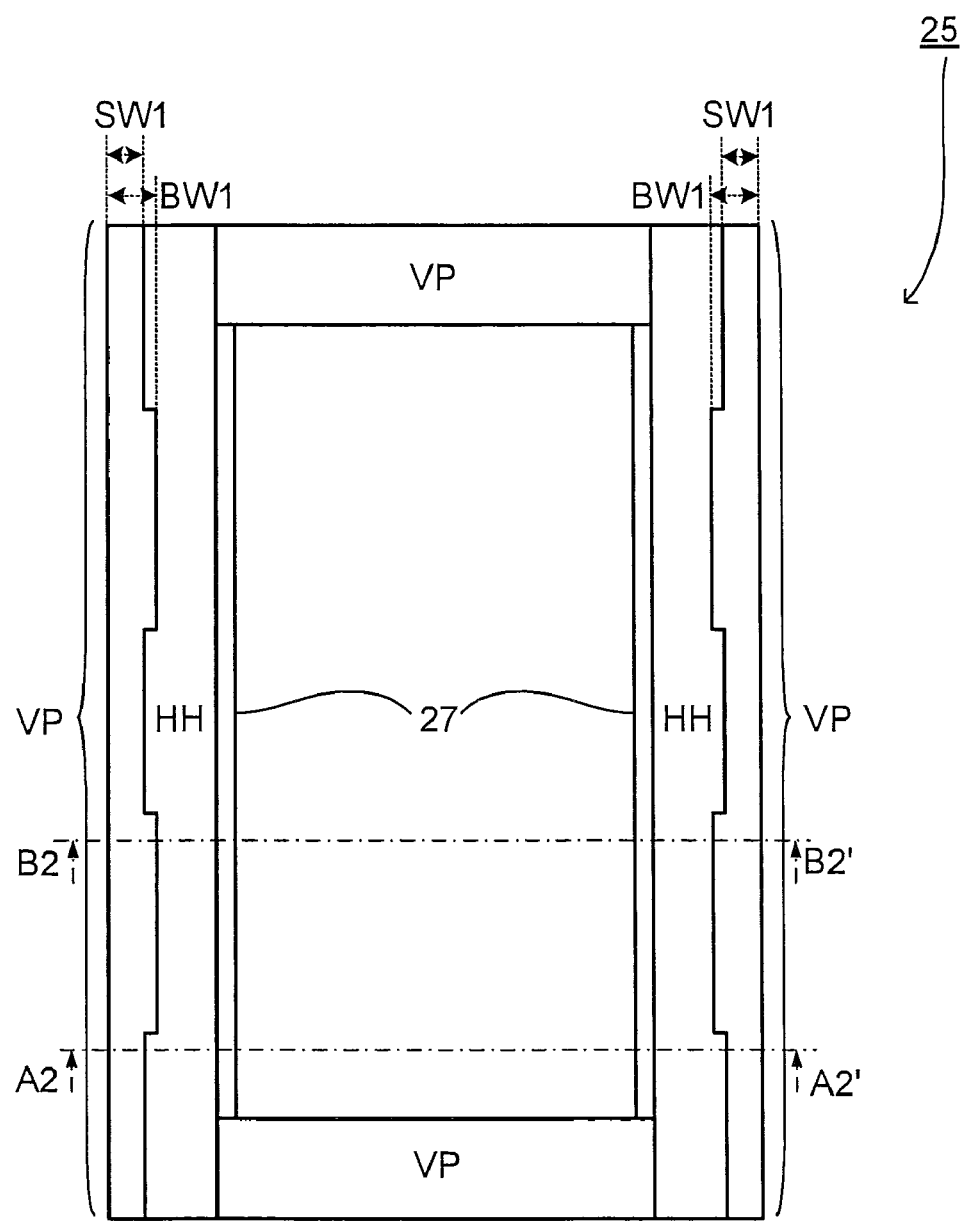
FIG. 5 is a plan view of a top housing member different from that shown in FIG. 2.

FIGS. 4 and 5 are illustrated in the same manners as FIGS. 1 and 2, respectively, and FIG. 6A and FIG. 6B are sectional views of a liquid crystal display device 69 (FIG. 6A and FIG.

6B are taken along lines A2-A2' and B2-B2', respectively, in FIGS. 4 and 5, and viewed from directions indicated by arrows).

As shown in FIG. 4, a hill section HH of the side section VP, the hill section HH forming part of a first groove DH1, extends along the longitudinal direction of the side section VP and protrudes toward the bottom section 22 of the bottom housing member 21. However, as shown in FIG. 5, the width (a short side) of a hill section HH varies along its long side.

This results in a nonuniform width of a first groove DH1, which is a gap between a hill section HH and the wall section 23. For example, assume that, as shown in FIG. 5, the width of a first groove DH1 is larger at its portions corresponding to the two end portions and the middle portion of a hill section HH than at portions corresponding to the other portions of the hill section HH in the longitudinal direction of the hill section HH.

Then, a groove width (a first narrow groove width) SW1, which is a width of a first groove DH1 at its portions corresponding to the two end and middle portions of a hill section HH in its longitudinal direction, is shorter than a groove width (a first broad groove width) BW1, which is a width of the first groove DH1 at its portions corresponding to the other portions of the hill section HH in its longitudinal direction.

And, if the comparatively narrow groove width SW1 has a length on the same order as the sum of the thickness of a mounting substrate 11 and the thickness of a bonding member BD, a mounting substrate 11 is held between the wall section 23 and three portions corresponding to the two end portions and the middle portion of a hill section HH in its longitudinal direction (see FIG. 6A). That is, the mounting substrate 11 is efficiently held at three points in its longitudinal direction.

On the other hand, since the comparatively large groove width BW1 is larger than the sum of the thickness of a mounting substrate 11 and the thickness of a bonding member BD, a mounting substrate 11 is not in contact with an inner surface of a first groove DH1 at portions corresponding to the portions of a hill section HH other than the two ends and middle portions of the hill section HH (see FIG. 6B).

Even with a backlight unit 49 including a first groove DH1 having a nonuniform groove width, the same operational effect is obtained as is obtained with a first groove DH1 having the first groove width W1 as shown in FIGS. 1 to 3. Moreover, since a hill section HH may be comparatively small in volume, cost reduction of the top housing member 25, and thus cost reduction of the backlight unit 49 can be achieved.

A first groove DH1 does not need to have a length of the same order as the longitudinal length of a mounting substrate 11, and two or more first grooves DH1 may be formed to hold a mounting substrate 11. For example, a plurality of first grooves DH1 may hold one mounting substrate 11. A description will be given of an example of such a case with reference to FIGS. 7 to 9.

Figure 7:
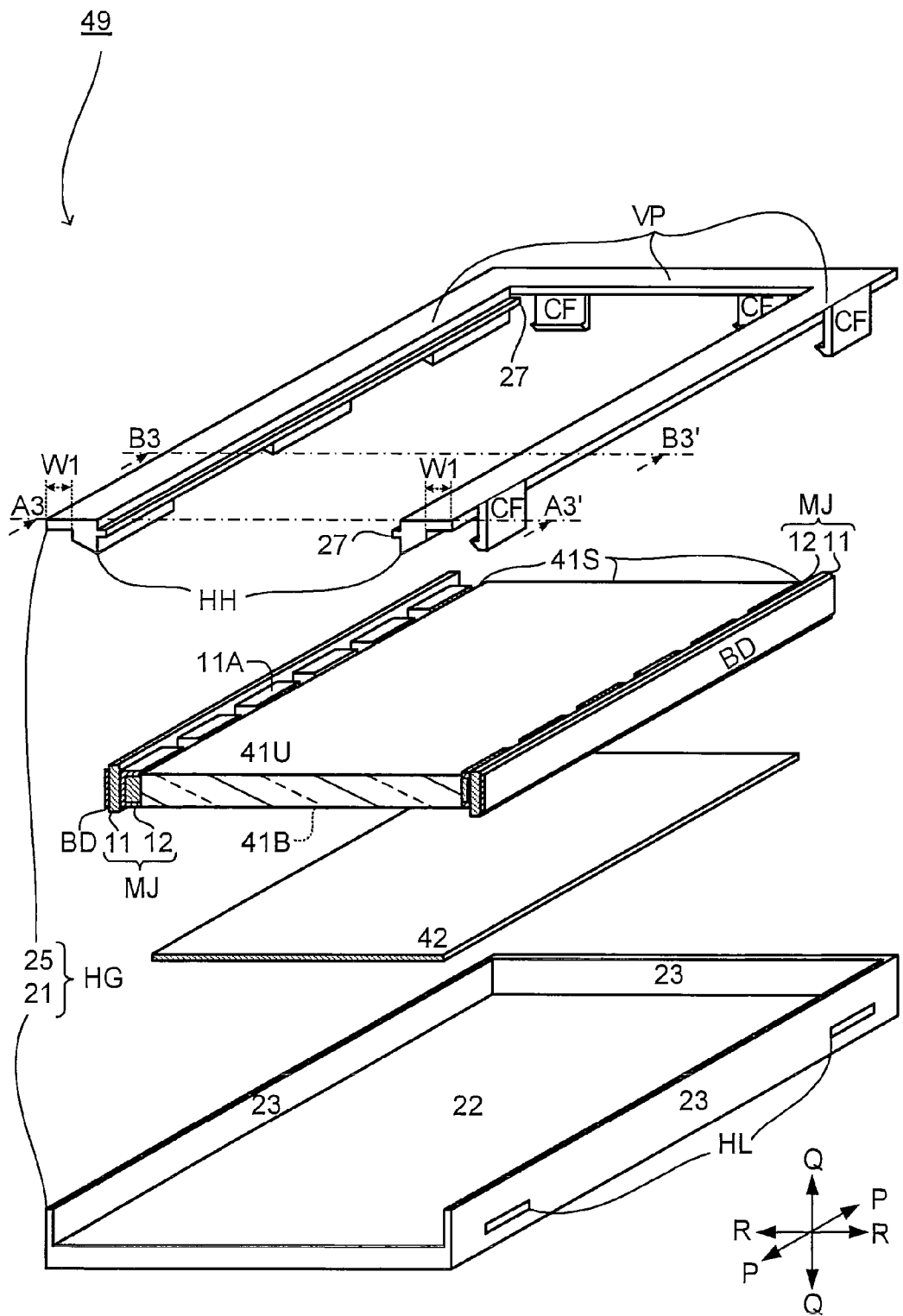
FIG. 7 is an exploded perspective view of a backlight unit different from those shown in FIG. 1 and FIG. 4.
Figure 8:
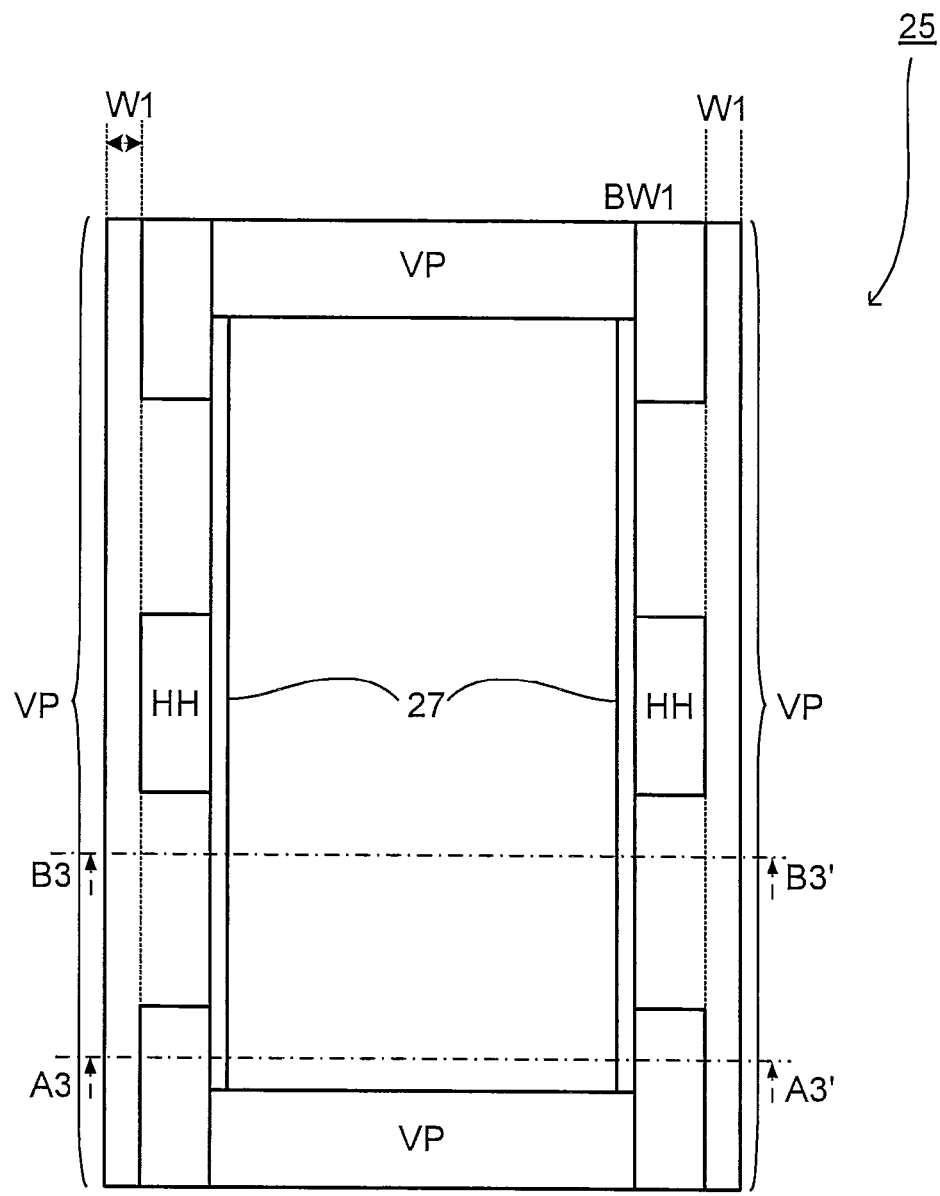
FIG. 8 is a plan view of a top housing member different from those shown in FIG. 2 and FIG. 5.
Figure 9A:
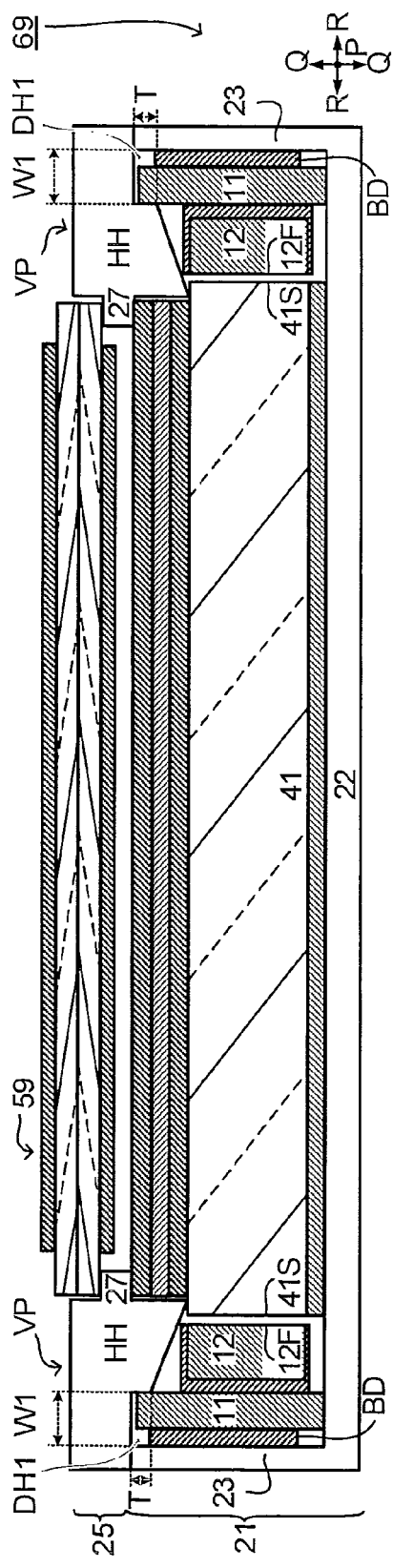
FIG. 9A is a sectional view of a liquid crystal display device different from those shown in FIG. 3 and FIGS. 6A/6B, taken along the sectional line indicated by line A3-A3' and viewed as indicated by the arrows shown in FIGS. 7 and 8.
Figure 9B:
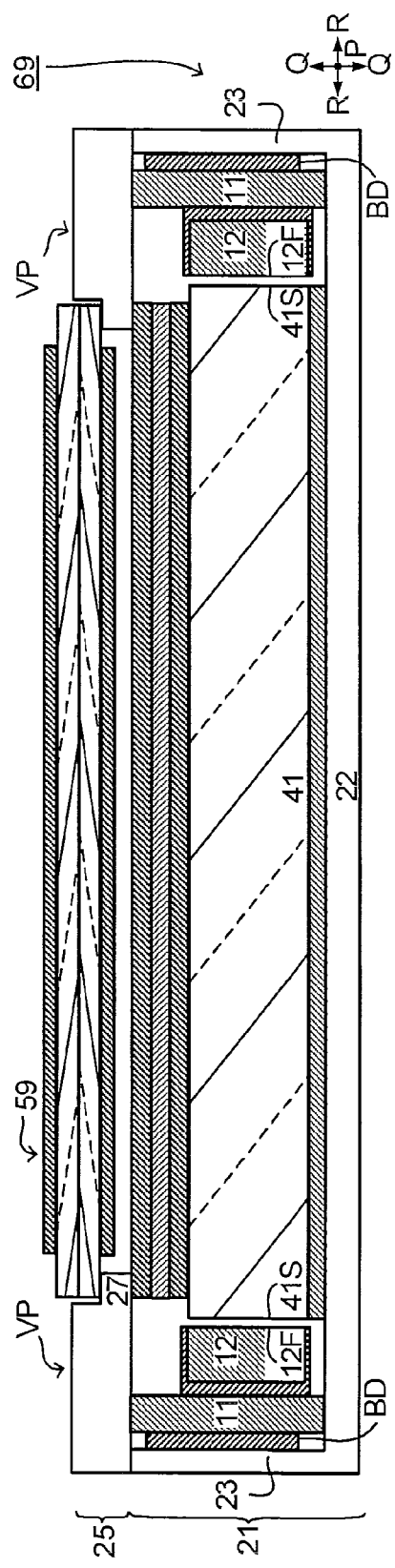
FIG. 9B is a sectional view of a liquid crystal display device different from those shown in FIG. 3 and FIGS. 6A/6B, taken along the sectional line indicated by line B3-B3' and viewed as indicated by the arrows shown in FIG. 7 and FIG. 8.

FIGS. 7 and 8 are illustrated in the same manners as FIGS. 1 and 2, respectively, and FIGS. 9A and 9B are sectional views of a liquid crystal display device 69 (FIGS. 9A and 9B are taken along lines A3-A3' and B3-B3', respectively, in FIGS. 7 and 8, and viewed from directions indicated by arrows).

As shown in FIG. 7, hill sections HH of a side section VP that form part of a first groove DH1 are positioned away from each other along the longitudinal direction of the side section VP, and protrudes toward a bottom section 22 of a bottom housing member 21. That is, the length of a hill section HH along the longitudinal direction of the side section VP is shorter than the length of the side section VP, and a plurality of hill sections HH are aligned along the longitudinal direction of the side section VP (in FIGS. 7 to 9, three hill sections HH are formed one at each of the positions corresponding to two end portions and a middle portion of the side section VP, but this is not meant to limit the positions and the number of hill sections HH to be formed).

With this structure, although there are some portions in a mounting substrate 11 corresponding to which no first groove DH 1 is formed, and that thus are not held in a first groove DH1, a mounting substrate 11 is held in the first grooves DH1 formed corresponding to three hill sections HH as shown in FIG. 9A. That is, a mounting substrate 11 is efficiently held at three portions in its longitudinal direction.

Thus, even with a backlight unit 49 including a first groove DH1 formed with hill sections HH arranged away from each other, the same operational effect is obtained as is obtained by use of a first groove DH 1 having the first groove width W1 as shown in FIGS. 1 to 3. Moreover, although three hill sections HH are provided, since the total volume of the three hill sections is smaller than that of the hill section HH that is formed in one piece as shown in FIGS. 1 to 3, cost reduction of the top housing member 25, and thus cost reduction of the backlight unit 49 can be achieved.

The top housing member 25 is preferably formed of, for example, a reflective white resin. This is for the purpose of reflecting light that fails to enter the light guide plate 41 through a side surface 41S and reaches the top housing member 25, to thereby help the light enter the light guide plate 41 through a side surface 41S.

In particular, it is preferable that a surface of a protrusion section rising in the top housing member 25 is positioned to cover a space between the light emission surfaces 12F of LEDs 12 and a side surface 41S of the light guide plate 41 (that is, it is preferable that a surface of a hill section HH is placed over between the light emission surfaces 12F of LEDs 12 and a side surface 41S of the light guide plate 41).

Figure 10:
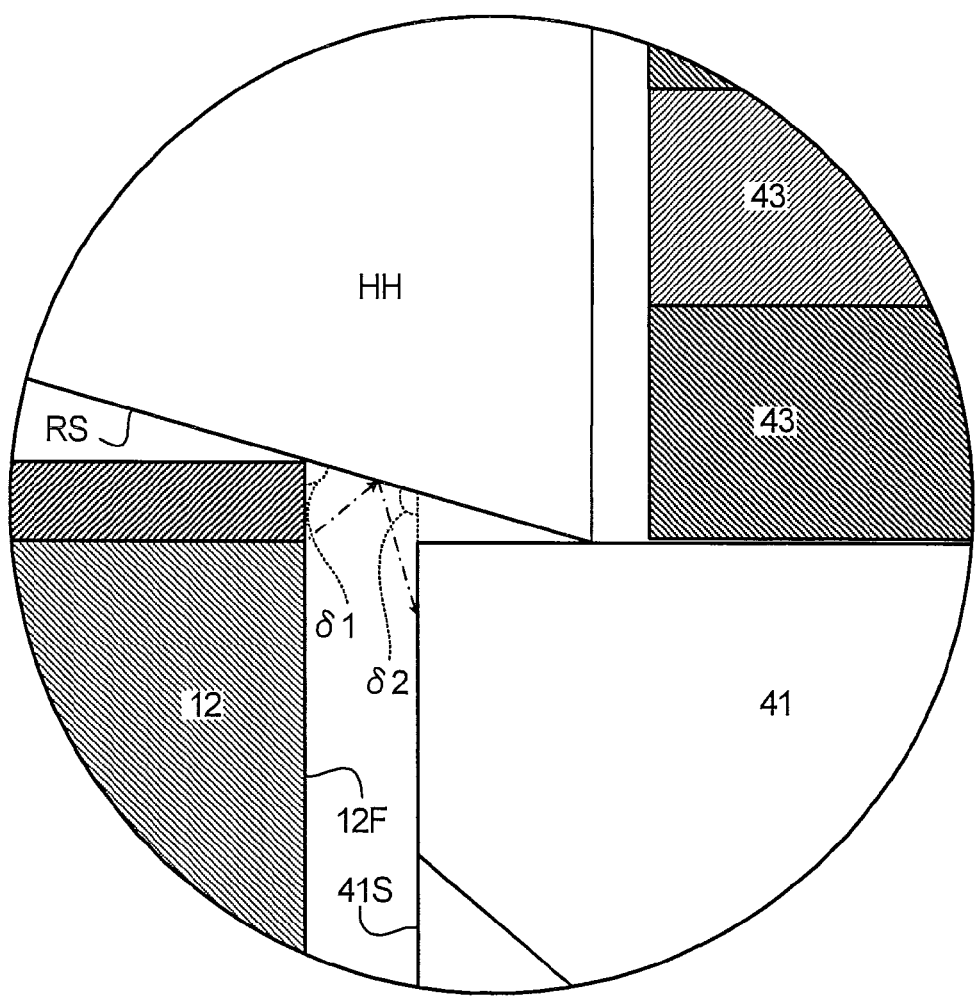
FIG. 10 is an enlarged sectional view showing the vicinity of a protrusion section in a side section.

With this structure, as shown in FIG. 10, there is formed a space that faces at least three surfaces, namely, the surface of a hill section HH (a reflection surface RS), the light emission surface 12F of an LED 12, and a side surface 41S of the light guide plate 41. Light from LEDs 12 travels around inside the space, and this makes it easier for the light to enter the light guide plate 41 through the side surface 41S of the light guide plate 41.

For example, light that does not directly enter the light guide plate 41 through a side surface 41S (see dash-dot line arrows in FIG. 10) is reflected on the reflection surface RS of the hill section HH to enter the light guide plate 41 through the side surface 41S. This contributes to the effective use of light from the LEDs 12.

In particular, in order to form the space facing at least the three surfaces of the reflection surface RS of a hill section HH, the light emission surface 12F of an LED 12, and the side surface 41S of the light guide plate 41, it is desirable that a hill section HH be thinner as it protrudes (that is, the hill section HH is tapered), that an angle ($\delta 1$) formed of the light emission surface 12F of an LED 12 and the reflection surface RS of the hill section HH be an acute angle, and further, that an angle ($\delta 2$) formed of the side surface 41S of the light guide plate 41 and the reflection surface RS of the hill section HH be an obtuse angle. This is because this structure allows light to behave as indicated by the dash-dot line arrows in FIG. 10.

Incidentally, in a case in which the top housing member 25 is formed of a non-reflective material (for example, a black resin that absorbs light), it is preferable that a reflection sheet is attached to the surface RS of a hill section HH. This also allows light to behave as indicated by the dash-dot line arrows shown in FIG. 10.

Second Embodiment

Next, a second embodiment will be described. Such members as function similarly to their counterparts in the first embodiment are identified by common reference signs and no description of them will be repeated.

In the backlight unit 49 dealt with in the description of the first embodiment, a mounting substrate 11 is held in a first groove DH1 formed of the side section VP of the top housing member 25 and the wall section 23 of the bottom housing member 21. The following description of the second embodiment will refer to FIGS. 11 and 12, and focus on the feature that a mounting substrate 11 is held in a second groove which is formed apart from a first groove DH1.

Figure 11:
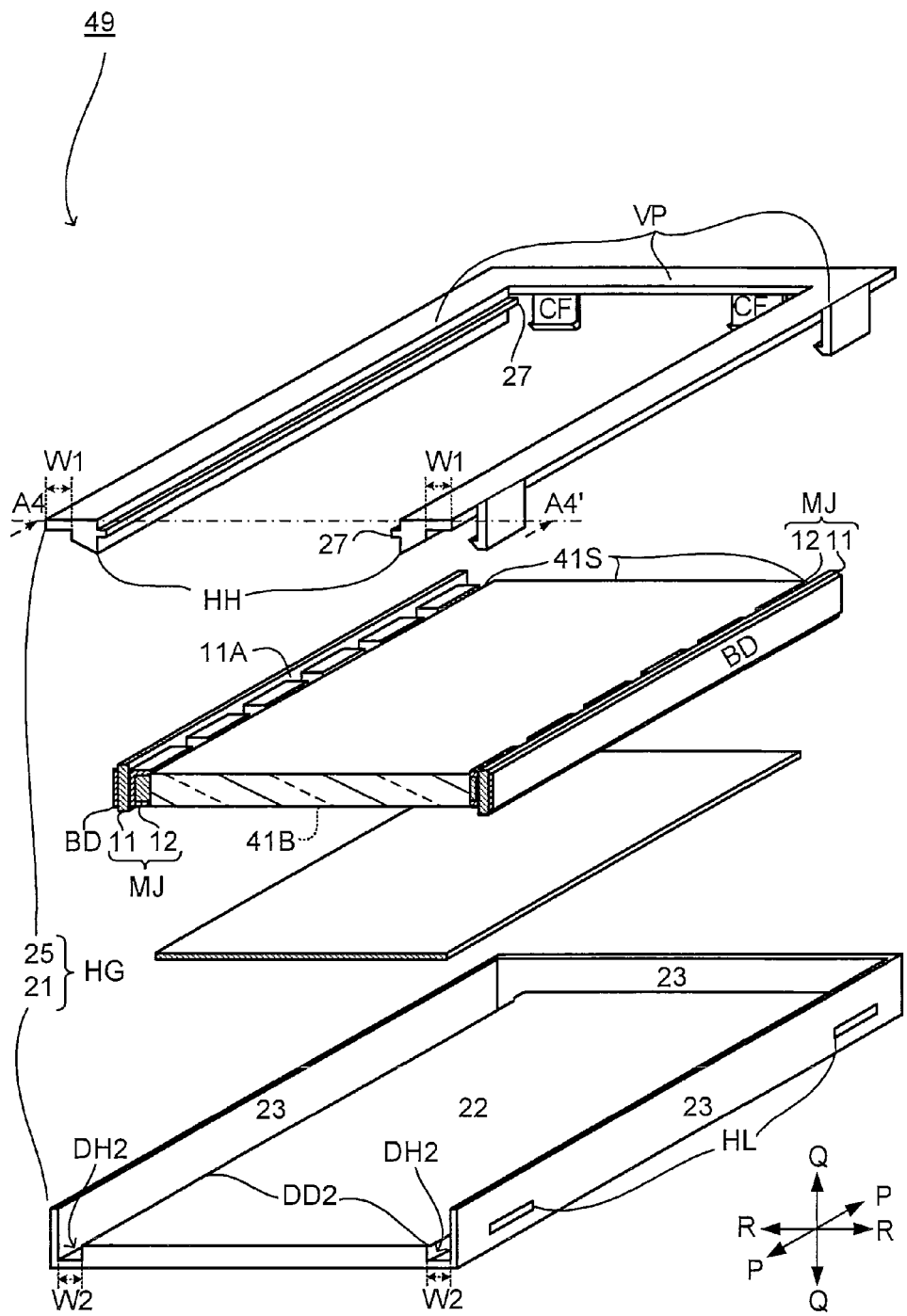
FIG. 11 is an exploded perspective view of a backlight unit different from those shown in FIGS. 1, 4 and 7.
Figure 12:
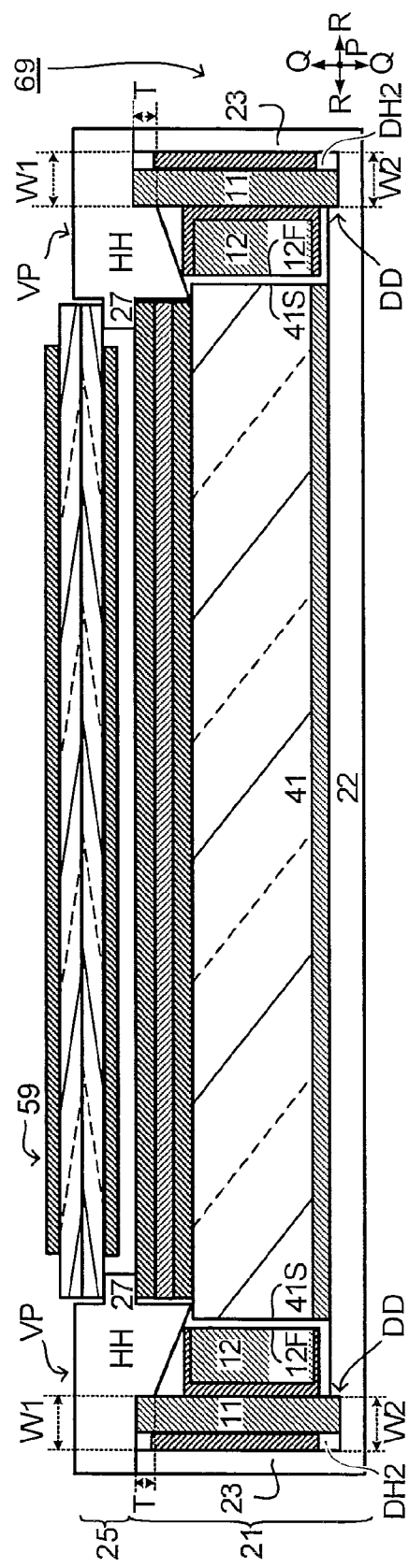
FIG. 12 is a sectional view of a liquid crystal display device different from those shown in FIG. 3, FIGS. 6A/6B and FIGS. 9A/9B (taken along the sectional line indicated by line A4-A4' and viewed as indicated by the arrows shown in FIG. 11)

FIG. 11 is illustrated in the same manner as FIG. 1, and FIG. 12 is illustrated in the same manner as FIG. 3 (here, FIG. 12 is a sectional view taken along line A4-A4' in FIG. 11).

As shown in FIGS. 11 and 12, a second groove DH2 includes, as part thereof, a level difference DD2 formed at an edge portion of a bottom section 22 of the bottom housing member 21. More specifically, an edge portion of the bottom section 22 of the bottom housing member 21 that overlap a portion of a side section VP of a top housing member 25, the portion including a hill section HH, is formed thinner than the other portions of the bottom section 22, and as a result, when the top housing member 25 is attached to the bottom housing member 21, there is generated a height difference between a surface including an edge portion of the bottom section 22 and a surface including the other portions of the bottom section 22, and this height difference is the level difference DD2.

A wall surface having a height equivalent to the level difference DD2 (hereinafter referred to as "leve-difference-DD2 wall surface") faces a wall section 23 of the bottom housing member 21, and thereby a second groove DH2 is formed between the wall section 23 and a level-difference-DD2 wall surface. That is, a space between a level-difference-DD2 wall surface and the wall section 23 that face each other forms a second groove DH2.

A groove width W2 of a second groove DH2 is of the same order as the sum of the thickness of a mounting substrate 11 and the thickness of a bonding member BD (it is preferable that the groove width W2 is of the same order as the first groove width W1). With this structure, when a long side of a mounting substrate 11 is placed in a second groove DH2 and a bonding member BD is interposed between a non-mounting surface 11B of a mounting substrate 11 and the wall section 23 of the bottom housing member 21, the mounting substrate 11 is attached to the wall section 23 by being fitted into the second groove DH2.

With this structure, since one of long sides of a mounting substrate 11 is held in a first groove DH1 and the other of the long sides is held in a second groove DH2, the mounting substrate 11 is less likely to warp and less likely to fall away from the wall section 23 of the bottom housing member 21. Also, heat in the LEDs 12 and the mounting substrate 11 escapes to the bottom housing member 21 through the second groove DH2.

As shown in FIG. 12, inner surfaces of a second groove DH2 that face each other are a level-difference-DD2 wall surface (that is, the bottom section 22) and the wall section 23. However, this is not meant to limit the present invention. For example, a groove in which a mounting substrate 11 is to be held may be carved in the bottom section 22 (that is, the second groove DH2 may be entirely formed of the bottom section 22).

As shown in FIGS. 11 and 12, in a second groove DH2, the groove width W2 is uniform all along the length of the second groove DH2, and the groove width W2 is of the same order as the sum of the thickness of a mounting substrate 11 and the thickness of a bonding member BD. However, the second groove DH2 may be formed otherwise, and one such example will be described with reference to FIGS. 13 and 14.

Figure 13:
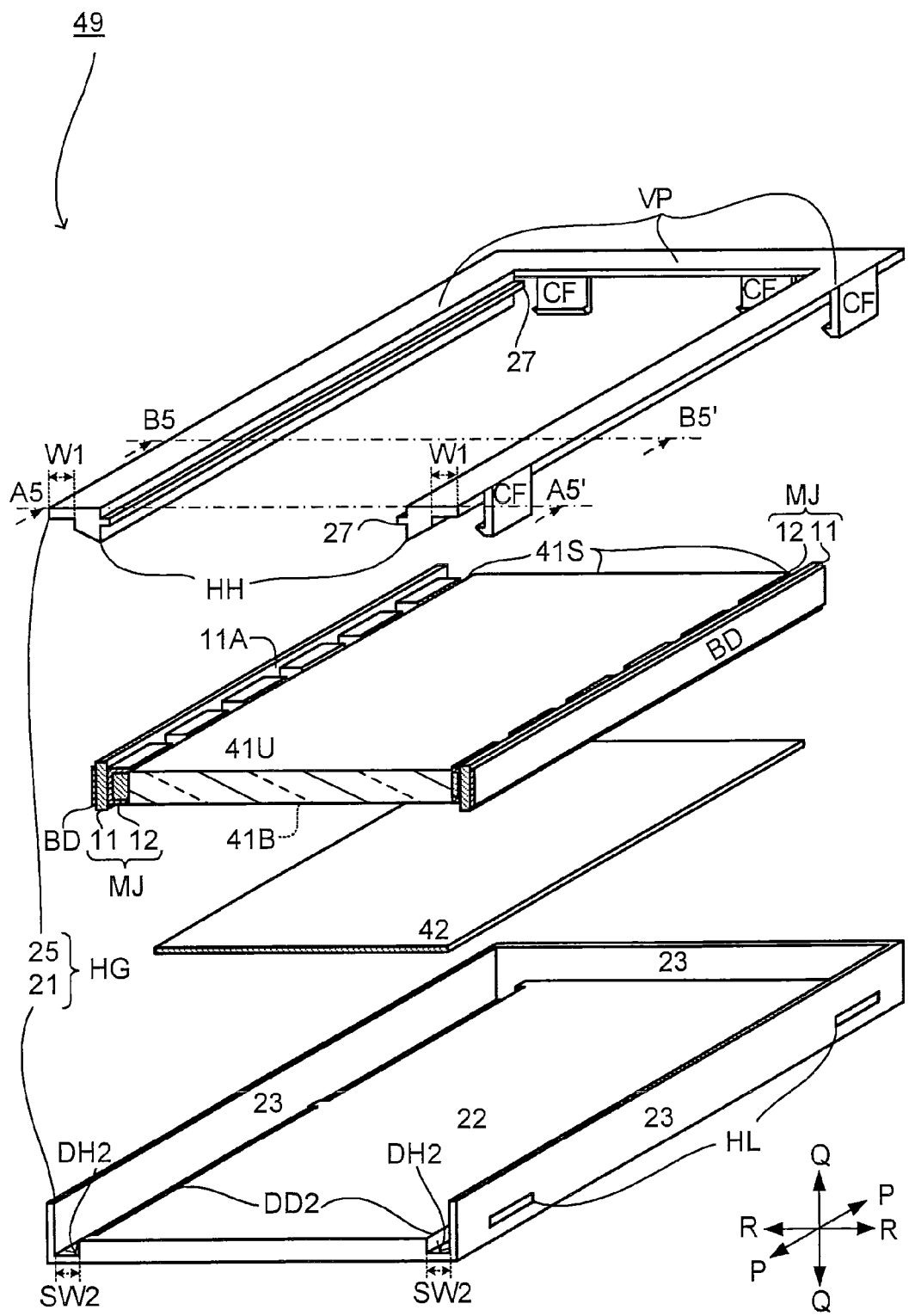
FIG. 13 is an exploded perspective view of a backlight unit different from those shown in FIG. 1, FIG. 4, FIG. 7 and FIG. 11.
Figure 14A:
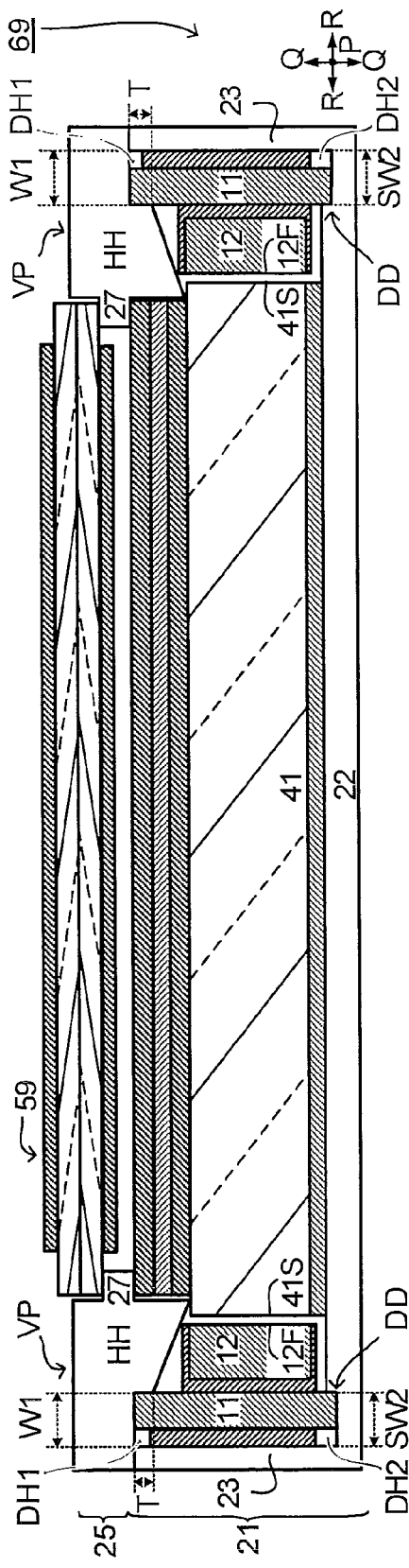
FIG. 14A is a sectional view of a liquid crystal display device different from those shown in FIG. 3, FIGS. 6A/6B, FIGS. 9A/9B and FIG. 12, taken along the sectional line indicated by line A5-A5' and viewed as indicated by the arrows shown in FIG. 13.
Figure 14B:
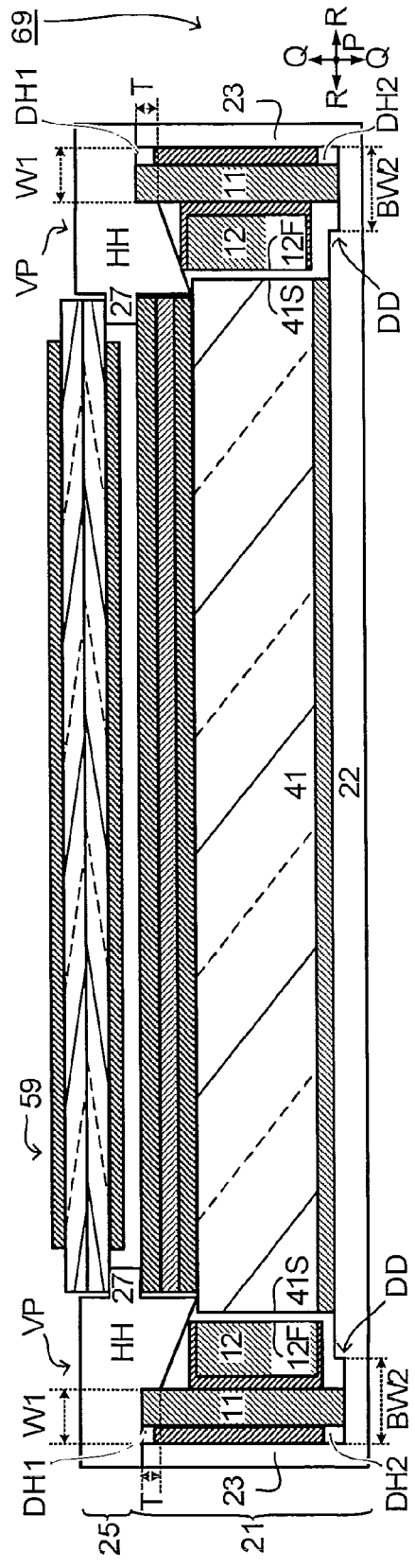
FIG. 14B is a sectional view of a liquid crystal display device different from those shown in FIG. 3, FIGS. 6A/6B, FIGS. 9A/9B and FIG. 12, taken along the sectional line indicated by line B5-B5' and viewed as indicated by the arrows shown in FIG. 13.

FIG. 13 is illustrated in the same manner as FIG. 11, and FIGS. 14A and 14B are sectional views of a liquid crystal display device 69 (FIGS. 14A and 14B are taken along lines A5-A5' and B5-B5', respectively, in FIG. 13, and viewed from directions indicated by arrows shown in FIG. 13).

As shown in FIGS. 13 and 14, a second groove DH2 has a nonuniform groove width. More specifically, portions of a wall surface corresponding to two end portions and a middle portion of a level difference DD2 in its longitudinal direction are closer to the wall section 23 than portions of the wall surface corresponding to the other portions of the level difference DD2 in its longitudinal direction.

Then, a groove width (a second narrow groove width) SW2, which is a distance between the wall section 23 and a wall surface corresponding to any of the two end portions and the middle portion of a level difference DD2 in its longitudinal direction, is shorter than a groove width (a second wide groove width) BW2 which is a distance between the wall section 23 and a wall surface corresponding to a portion of the level difference DD2 other than the two end portions and the middle portions in its longitudinal direction.

And, if the comparatively narrow groove width SW2 is of the same order as the sum of the thickness of a mounting substrate 11 and the thickness of a bonding member BD, a mounting substrate 11 is held between the wall section 23 and each of three wall surfaces corresponding to two end portions and a middle portion of a level difference DD2 (see FIG. 14A). That is, a mounting substrate 11 is efficiently held at three portions in its longitudinal direction.

On the other hand, since the comparatively wide groove width BW2 is larger than the sum of the thickness of a mounting substrate 11 and the thickness of a bonding member BD, a mounting substrate 11 is not in contact with wall surfaces corresponding to portions other than the two ends portions and the middle portion of a level difference DD2 along its length direction (see FIG. 6B).

Even with a backlight unit 49 including a second groove DH2 whose width is not uniform, the same operational effect is obtained as is obtained by use of the second groove DH2 having the second groove width W2 as shown in FIGS. 11 and 12. Moreover, since the comparatively large groove width contributes to reduction of the volume of the bottom housing member 21, cost reduction of the bottom housing member 21, and thus cost reduction of the backlight unit 49 can be achieved.

A second groove DH2 is not limited to a groove that is carved down into a surface of the bottom section 22 of the bottom housing member 21. A description will be given of an example of such a case with reference to FIGS. 15 and 16.

Figure 15:
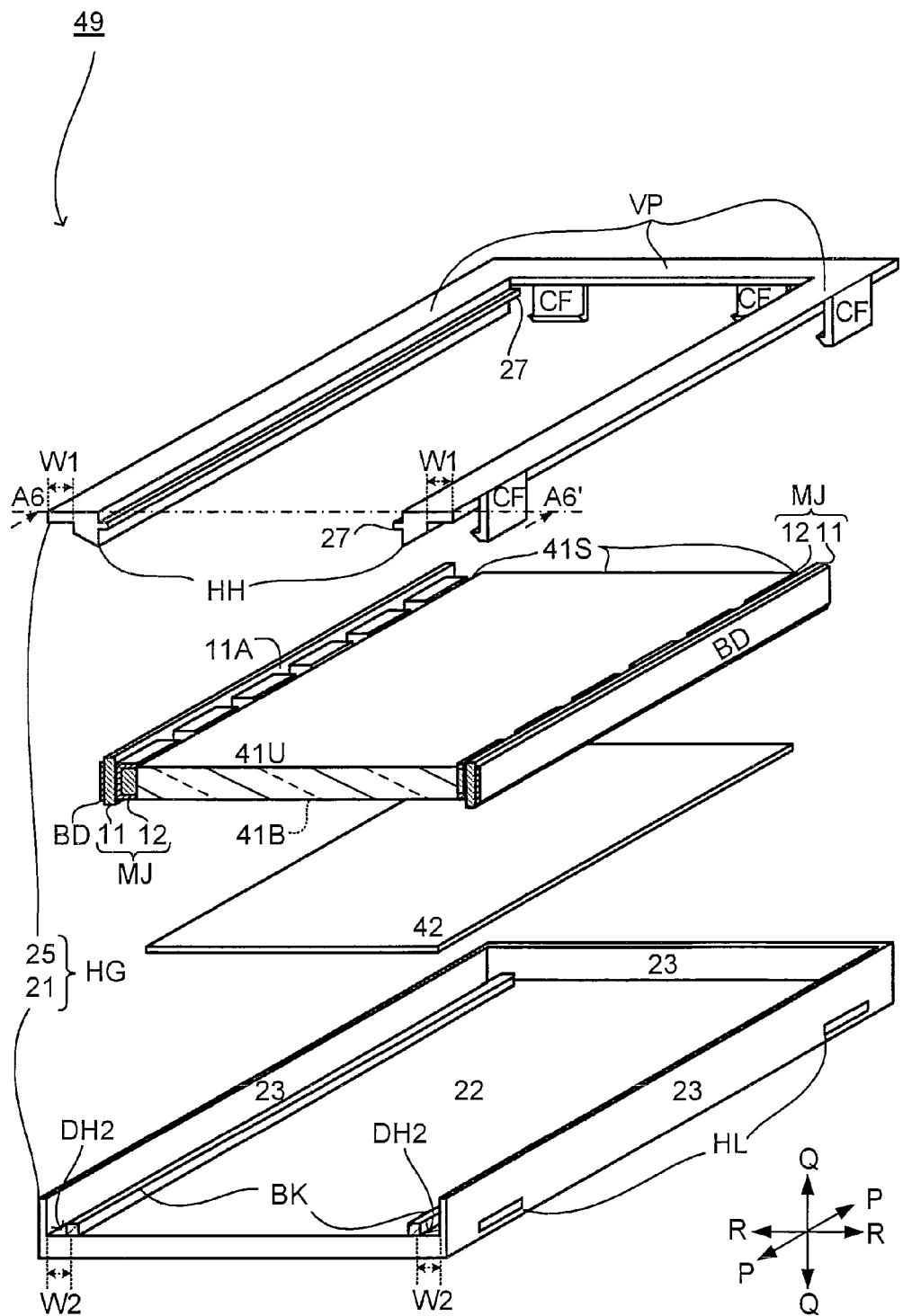
FIG. 15 is an exploded perspective view of a backlight unit different from those shown in FIG. 1, FIG. 4, FIG. 7, FIG. 11 and FIG. 13.
Figure 16:
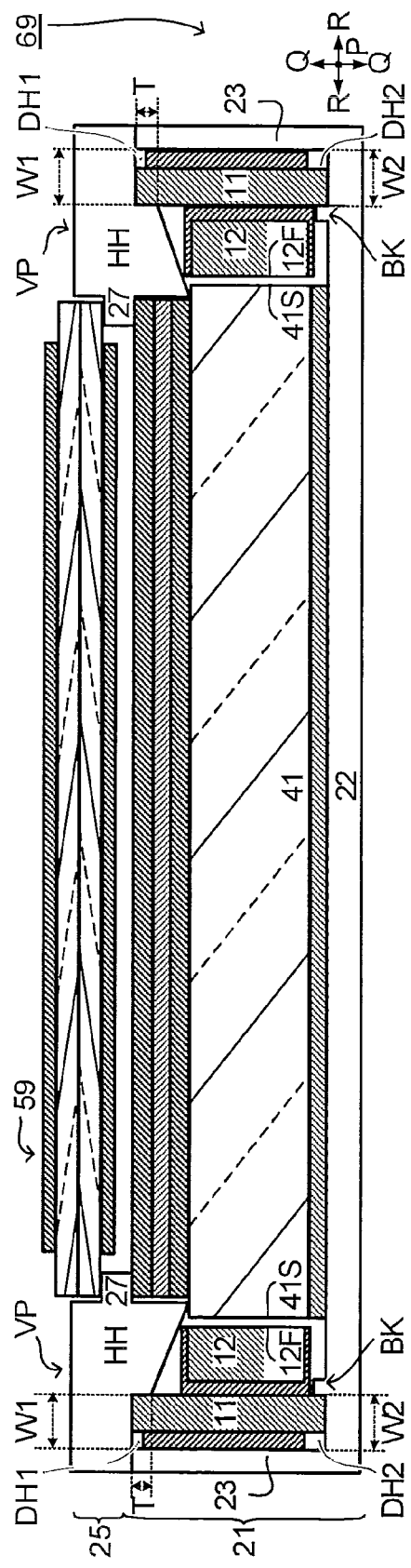
FIG. 16 is a sectional view of a liquid crystal display device different from those shown in FIG. 3, FIGS. 6A/6B, FIGS. 9A/9B, FIG. 12 and FIGS. 14A/14B (taken along the sectional direction indicated by line A6-A6' and viewed as indicated by the arrows shown in FIG. 15)

FIG. 15 is illustrated in the same manner as FIG. 11, and FIG. 16 is a sectional view showing a liquid crystal display device 69 (here, FIG. 16 is a sectional view taken along line A6-A6' in FIG. 15, and viewed from directions indicated by arrows shown in FIG. 15).

As shown in FIGS. 15 and 16, a second groove DH2 may be a space between a surface of a bottom section 22 of a bottom housing member 21, in particular a block BK placed along an edge of the bottom section 22, and the wall section 23 (here, a block BK is part of the bottom section 22, and is a member that gives a level difference to a surface of the bottom section 22). With this structure, as shown in FIG. 16, a mounting substrate 11 is held in a second groove DH2 formed corresponding to a block BK.

Thus, even with a backlight unit 49 including a second groove DH2 formed with a block BK, the same operational effect is obtained as is obtained by use of the second groove DH2 having the second groove width W2 as shown in FIGS. 11 and 12.

Also, two or more second grooves DH2 may be formed to hold a mounting substrate 11. For example, a plurality of second grooves DH2 may hold one mounting substrate 11. For example, a plurality of first grooves DH1 may hold one mounting substrate 11. A description will be given of an example of such a case with reference to FIGS. 17 and 18.

Figure 17:
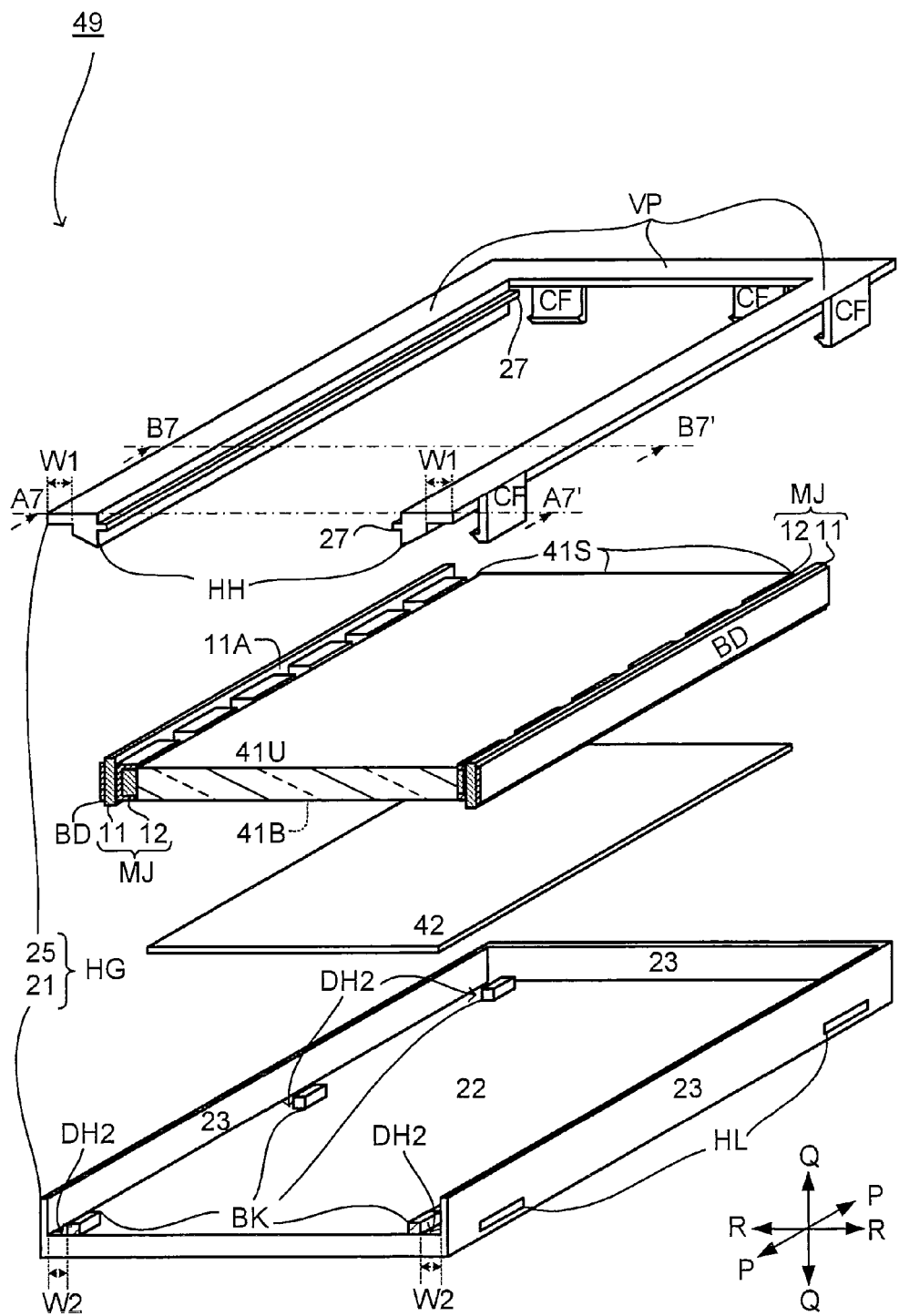
FIG. 17 is an exploded perspective view of a backlight unit different from those shown in FIG. 1, FIG. 4, FIG. 7, FIG. 11, FIG. 13 and FIG. 15.

FIG. 17 is illustrated in the same manner as FIG. 11, and FIGS. 18A and 18B are sectional views of a liquid crystal display device 69 (FIGS. 18A and 18B are taken along lines A7-A7' and B7-7', respectively, in FIG. 17, and viewed from directions indicated by arrows shown in FIG. 17).

As shown in FIGS. 17 and 18, a second groove DH2 is a space between a block BK and a wall section 23, a plurality of blocks BK placed away from each other along an edge of the bottom section 22 (FIGS. 17 and 18 show that three blocks BK are formed at two end portions and a middle portion along an edge of the bottom section 22, but this is not meant to limit the positioning and the number of the blocks BK).

With this structure, although there are some portions in a mounting substrate 11 corresponding to which no second groove DH2 is formed, and that thus are not held in a second groove DH2, a mounting substrate 11 is held in the second grooves DH2 formed corresponding to three blocks BK as shown in FIG. 18A. That is, a mounting substrate 11 is efficiently held at three portions in its longitudinal direction.

Thus, even with a backlight unit 49 including a second groove DH2 formed with a block BK, the same operational effect is obtained as is obtained by use of a second groove DH2 having the second groove width W2 as shown in FIGS. 11 and 12.

The bottom housing member 21 is preferably formed of, for example, a reflective white resin. This is for the purpose of reflecting light that fails to enter the light guide plate 41 through the side surfaces 41S and reaches the bottom housing member 25, to thereby help the light enter the light guide plate 41 through a side surface 41S.

Figure 19:
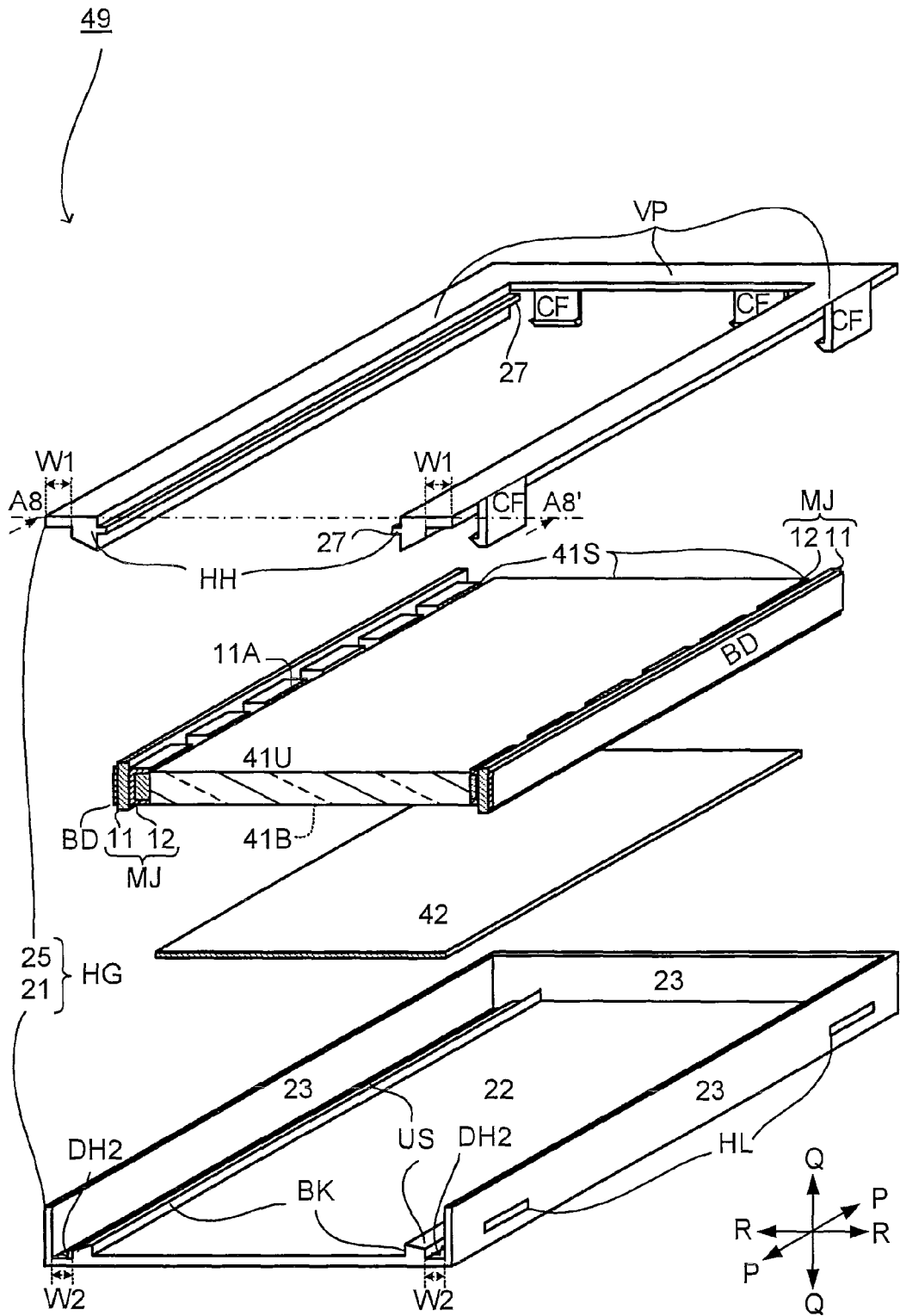
FIG. 19 is an exploded perspective view of a backlight unit different from those shown in FIG. 1, FIG. 4, FIG. 7, FIG. 11, FIG. 13, FIG. 15 and FIG. 17.
Figure 20:
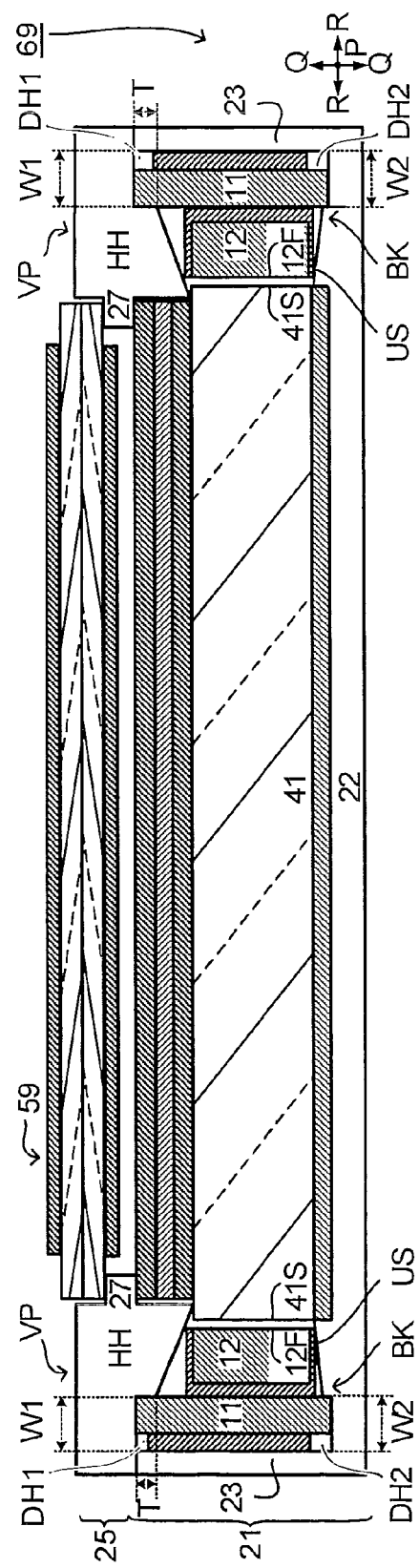
FIG. 20 is a sectional view of a liquid crystal display device different from those shown in FIG. 3, FIGS. 6A/6B, FIGS. 9A/9B, FIG. 12, FIGS. 14A/14B, FIG. 16 and FIGS. 18A/18B (taken along the sectional direction indicated by line A8-A8' and viewed as indicated by the arrows shown in FIG. 19)

For example, as shown in FIGS. 19 and 20 (which are illustrated in the same manners as FIGS. 11 and 12, respectively; and FIG. 20 is a sectional view taken along line A8-A8', and viewed as indicated by arrows in FIG. 19), it is preferable that a top surface US of a block BK is placed so as to cover a space between the light emission surfaces 12F of LEDs 12 and a side surface 41S of the light guide plate 41 (that is, a top surface US of a block BK is placed over between light emission surfaces 12F of LEDs 12 and a side surface 41S of the light guide plate 41).

Figure 21:
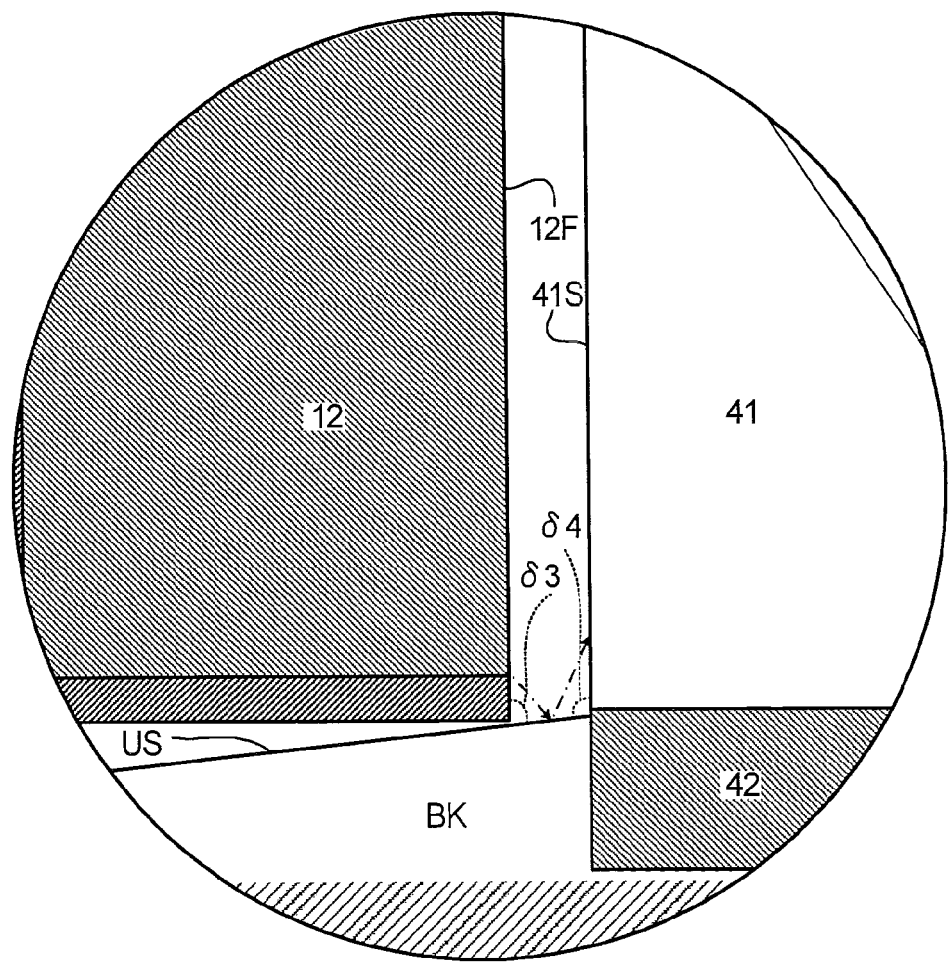
FIG. 21 is an enlarged sectional view showing the vicinity of a block.

With this structure, as shown in FIG. 21, there is formed a space that faces at least three surfaces, namely, the top surface of a block BK (a reflection surface US), the light emission surface 12F of an LED 12, and a side surface 41S of the light guide plate 41. Light from LEDs 12 travels around inside the space, and this makes it easier for the light to enter the light guide plate 41 through a side surface 41S of the light guide plate 41.

For example, light that does not enter the light guide plate 41 directly through a side surface 41S thereof (see the dash-dot line arrow) is reflected on the top surface of a block BK to enter the light guide plate 41 through a side surface 41S thereof. This contributes to the effective use of light from the LEDs 12.

In particular, in order to generate the space facing at least the three surfaces of the top surface US of a block BK, the light emission surface 12F of an LED 12, and a side surface 41S of the light guide plate 41, it is desirable that a block BK be thinner as it protrudes (that is, a block BK is tapered), that an angle (δ3) formed by the light emission surface 12F of an LED 12 and the top surface US of a block BK be an acute angle, and further, that an angle (δ4) formed by the side surface 41S of the light guide plate 41 and the top surface US of the block BK be an obtuse angle. This is because this structure allows light to behave as indicated by the dash-dot line arrows shown in FIG. 21.

Incidentally, in a case in which the bottom housing member 21 is formed of a non-reflective material, it is preferable that a reflection sheet is attached to the top surface US of a block BK. This is because such a structure also allows light to behave as indicated by the dash-dot line arrows shown in FIG. 21.

Other Embodiments

It should be understood that the embodiments specifically described above are not meant to limit the present invention, and that many variations and modifications can be made within the spirit of the present invention.

For example, it is preferable that a protrusion (a support portion) 27 is formed to protrude from the side section VP (for example, a portion of the side section VP including a hill section HH) of the top housing member 25 toward the inside of the frame. And, it is desirable that the protrusion 27 support a liquid crystal display panel 59. Such a protrusion 27 is also capable of pressing down an optical sheet group 46.

However, this is not meant to limit the way the liquid crystal display panel 59 is supported, and the liquid crystal display panel 59 may be supported by the entire side section VP. In such a case, the protrusion 27 is not necessary. However, since edges of the optical sheet group 46 are held by the side section VP (in particular by the hill sections HH), the side section VP functions also as a positioning member for the optical sheet group 46 (it goes without saying that even in the case in which the protrusion 27 is provided, the side section VP functions as the positioning member for the optical sheet group 46).

Figure 22:
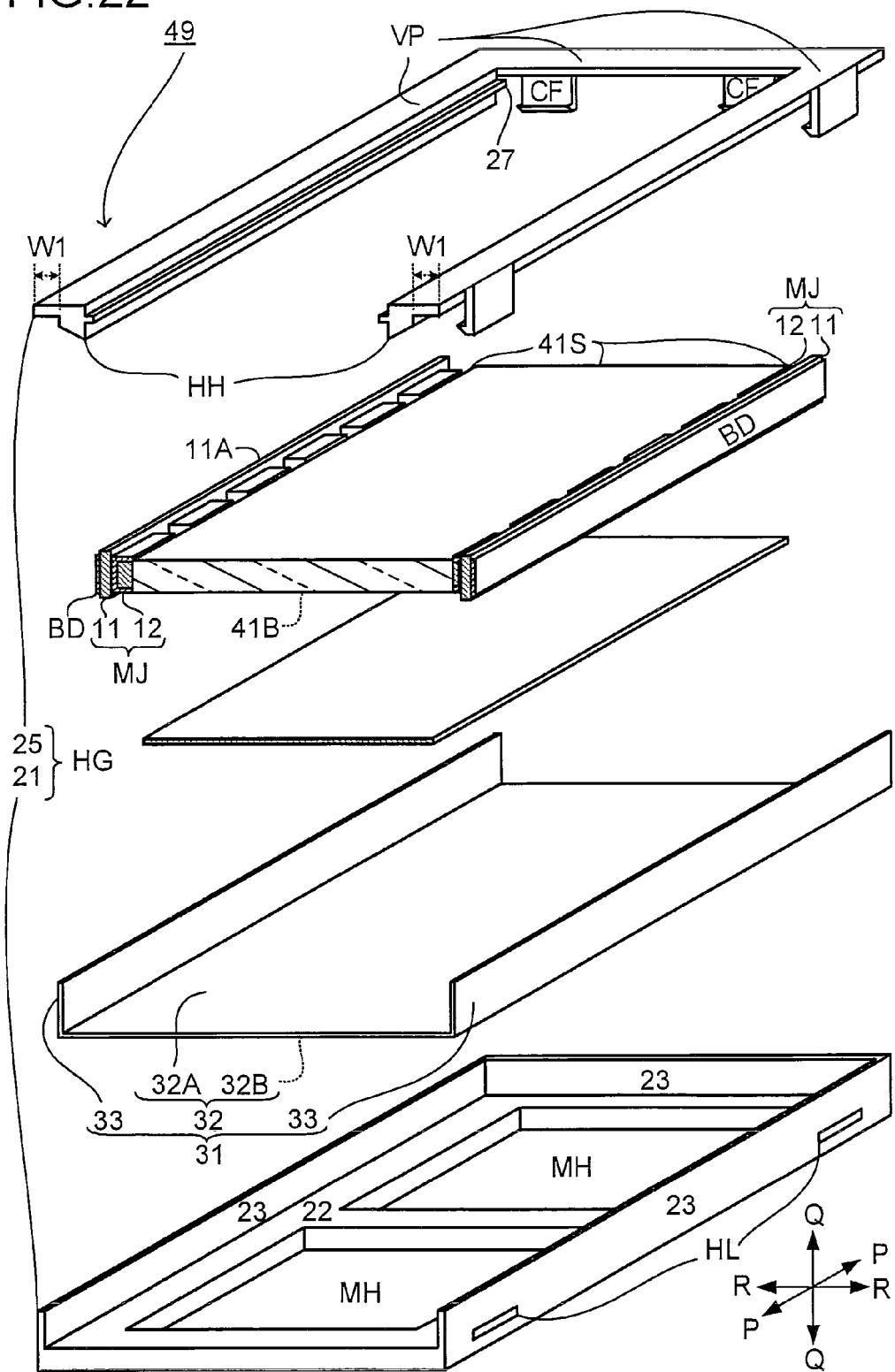
FIG. 22 is an exploded perspective view of a backlight unit different from those shown in FIG. 1, FIG. 4, FIG. 7, FIG. 11, FIG. 13, FIG. 15, FIG. 17 and FIG. 19.

As shown in FIG. 22, there may be interposed a heat dissipation plate 31 between the reflection sheet 42 and the bottom housing member 21. The heat dissipation plate 31 is formed of a material such as metal having a comparatively high thermal conductivity, and includes a bottom plate 32 covered with the reflection sheet, and two wall plates 33 located such that the bottom plate 32 is placed between the two wall plates 33 (incidentally, the section of the heat dissipation plate 31 along its short side direction has a recessed shape).

In a case in which such a heat dissipation plate 31 is provided, the non-mounting surface 11B of a mounting substrate 11 is attached to the inside of a wall plate 33 with a bonding member BD interposed in between (the mounting substrate 11 and the wall plate 33 may be in direct contact with each other with the bonding member BD omitted). That is, an LED module MJ is attached to the heat dissipation plate 31 with a bonding member BD interposed in between. Thus, heat generated during the operation of the LEDs 12 does not stay in the LEDs 12 themselves and the mounting substrate 11, but escapes to the heat dissipation plate 31 via the bonding member BD, and further escapes from the heat dissipation plate 31 to the bottom housing member 21.

Figure 23:
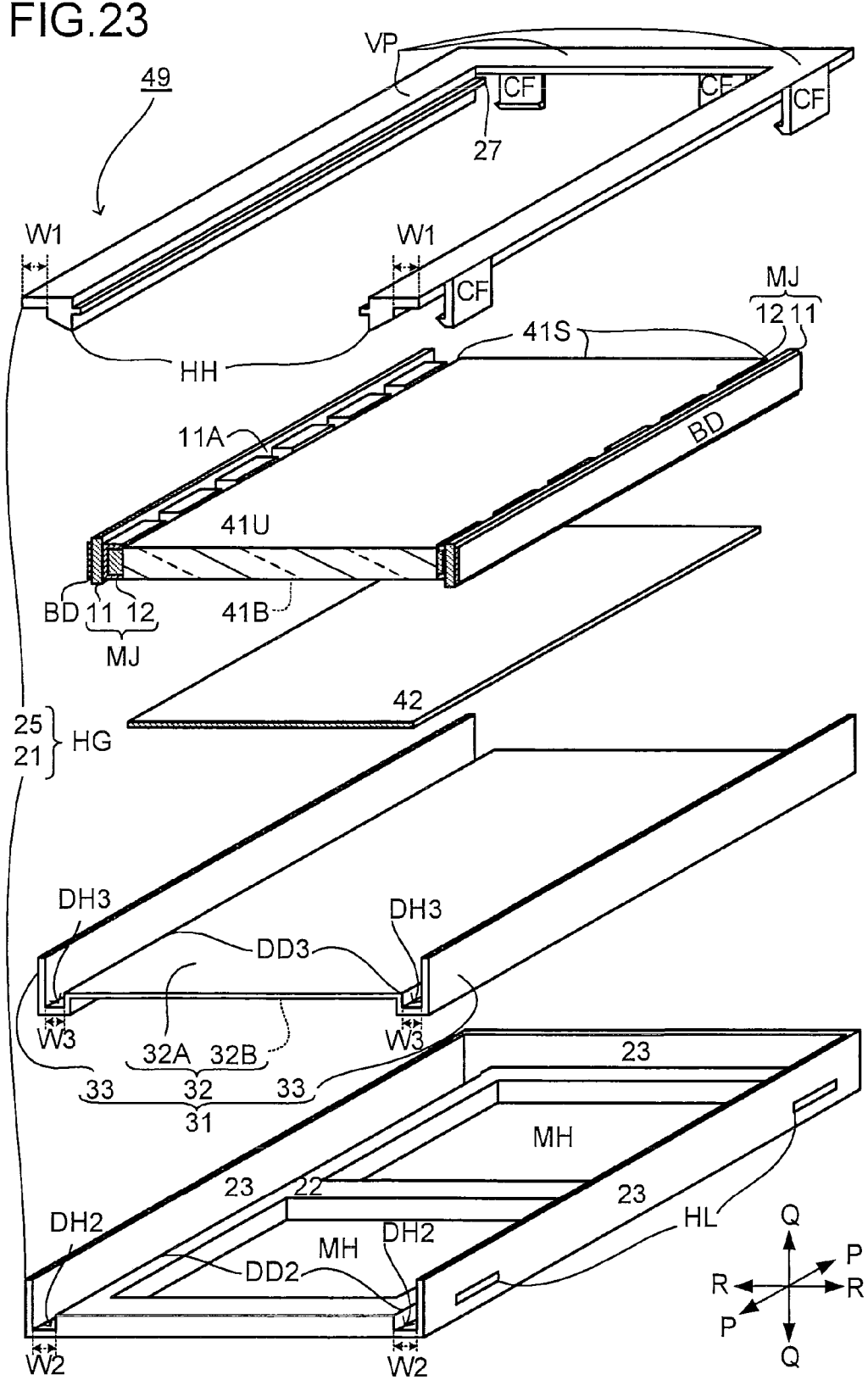
FIG. 23 is an exploded perspective view of a backlight unit different from those shown in FIG. 1, FIG. 4, FIG. 7, FIG. 11, FIG. 13, FIG. 15, FIG. 17, FIG. 19 and FIG. 22.

Also, in the case in which a second groove DH2 is fowled in the bottom section 22 of the bottom housing member 21 with an LED module MJ attached to a wall plate 33 of the heat dissipation plate 31 as shown in FIG. 23, the mounting substrate 11, together with the bottom plate 32 of the heat dissipation plate 31, needs to be held in the second groove DH2.

To satisfy this need, the bottom plate 32 of the heat dissipation plate 31 includes a level difference DD3 similar to the level difference included in the bottom section 22 of the bottom housing member 21. More specifically, a folding line (a valley-folding line) is formed next to an edge of the bottom plate 32 from which a wall plate 33 continues, and a reverse folding line (a mountain folding line) is formed next to the folding line (the valley-folding line). That is, a valley fold is formed next to an edge of the bottom plate 32 from which a wall plate 33 continues, and further, a mountain fold is formed next to the valley fold. Thereby, there is formed a level difference DD3 by the amount of which a front surface 32A of the bottom plate 32 is depressed (in other words, a protruding level difference DD3 is formed on a rear surface 32B of the bottom plate 32).

And, the wall surface of a depressed level difference DD3 formed in the front surface 32A faces a wall plate 33 of the heat dissipation plate 31 to form a third groove DH3 between the wall plate 33 and the wall surface of the level difference DD3. That is, a space between a wall surface of level difference DD3 and a wall plate 33 that face each other is a third groove DH3.

A groove width W3 of a third groove DH3 has a length of the same order as the sum of the thickness of a mounting substrate 11 and the thickness of a bonding member BD. Thus, when a long side of a mounting substrate 11 is placed in a third groove DH3 and a bonding member BD is interposed between the rear surface 11B of the mounting substrate 11 and the wall plate 33 of the heat dissipation plate 31, the mounting substrate 11 is attached to the heat dissipation plate 31 and held in the third groove DH3.

Furthermore, the depth of a third groove DH3 is set to be of the same order as the depth of the second depth DH2, and a projecting level difference DD3 having a length of the same order of magnitude as the depth of a second groove DH2 is formed on the rear surface 32B of the bottom plate 32. Moreover, the groove width W2 of a second groove DH2 is set to be longer than the groove width W3 of a third groove DH3. More specifically, the groove width W2 of a second groove DH2 has the same order of magnitude as the sum of the thickness of a mounting substrate 11, the thickness of a bonding member BD, the thickness of the heat dissipation plate 31 that is in contact with the mounting substrate 11, and the thickness of the heat dissipation plate 31 that is in contact with the bonding member BD.

With this structure, when the heat dissipation plate 31 having a mounting substrate 11 set in a third groove DH3 is set in the bottom housing member 21 keeping the wall plates 33 in contact with the wall section 23 of the bottom housing member 21, a mounting substrate 11 held in a third groove DH3 is set in a second groove DH2 (that is, a mounting substrate 11 is held in a second groove DH2).

As a result, heat generated during the operation of the LEDs 12 does not stay in the LEDs 12 themselves and a mounting substrate 11, but escapes to the heat dissipation plate 31 via a bonding member BD, and further escapes from the heat dissipation plate 31 to the bottom housing member 21.

In a case in which a second groove DH2 has a complicated shape (see, for example, FIGS. 13 and 17), it is preferable that a third groove DH3 of the heat dissipation plate 31 is formed by using a metal mold (it goes without saying that the heat dissipation plate 31 including a third groove DH3 as shown in FIG. 23 may be formed by using a metal mold).

In the descriptions given hereinbefore, an LED module MJ is attached to the bottom housing member 21 or to the heat dissipation plate 31 by use of a bonding member BD, but with a first groove DH1 or a second groove DH2, it is possible to attach an LED module MJ to the bottom housing member 21 or to the heat dissipation plate 31 without using a bonding member BD.

A middle hole MH may be formed in the bottom section 22 of the bottom housing member 21 so as to, for example, reduce the weight of the backlight unit 49 (see FIGS. 22 and 23).

In the descriptions given hereinbefore, the housing HG is composed of two separate members, namely, the top housing member 25 and the bottom housing member 21. However this is not meant to limit the present invention. That is, the top housing member 25 and the bottom housing member 21 may be integrally formed as one housing HG, or instead, the housing HG may be composed with three separate members.

In the descriptions given hereinbefore, LED modules MJ are arranged such that each LED module MJ faces a corresponding one of two opposite side surfaces 41S and 41S of the light guide plate 41 that face each other, but this is not meant to limit the present invention. That is, an LED module MJ or LED modules MJ may be provided to face one, three, or four side surfaces 41s of the light guide plate 41.

It goes without saying that embodiments obtained by appropriately combining technical means disclosed in different embodiments with each other are also included in the technical scope of the present invention. For example, various combinations of a plurality of kinds of top housing members 25 and a plurality of kinds of bottom housing members 21 are possible.

The housing HG may include only a first groove DH1, or may include only a second groove DH2. This is because if the housing HG includes at least either a first groove DH1 or a second groove DH2, an LED module MJ can be properly mounted in the backlight unit 49.

The invention claimed is:

1. A backlight unit, comprising:
a light emitting block;
a mounting substrate on which the light emitting block is mounted;
a light guide plate that receives light coming from the light emitting block, the light guide plate allowing the light to pass therethrough and guiding the light to an outside thereof;
a housing in which the light emitting block, the mounting substrate, and the light guide plate are housed, wherein the housing includes:
   a bottom section that supports the light guide plate;
   a wall section that rises from the bottom section; and
   a protrusion section that is supported by the wall section, protrudes toward the bottom section, and extends in a direction that intersects a direction in which the wall section rises, and
the protrusion section is at least part of a first groove in which the mounting substrate is held, wherein one of the first groove is formed for one of the mounting substrates and wherein there exists, along a length of the first groove, a first narrow groove width at which the first groove is in close contact with both a mounting surface and a non-mounting surface of the mounting substrate, and a first wide groove width that is wider than the first narrow groove width.

2. The backlight unit of claim 1, wherein one of opposite inner surfaces of the first groove that face each other is formed of the protrusion section, and another one of the opposite inner surfaces of the first groove is formed of the wall section.

3. The backlight unit of claim 1, wherein, portions of the first groove having the first narrow groove width are positioned corresponding at least to a middle portion and two end portions of the mounting substrate along a length of the mounting substrate.

4. The backlight unit of claim 1, wherein
the first groove has a length shorter than the length of the mounting substrate,
a plurality of first grooves are formed as the first groove with respect to the mounting substrate, and
the plurality of first grooves are positioned corresponding at least to a middle portion and two end portions of the mounting substrate along a length of the mounting substrate.

5. The backlight unit of claim 1, wherein an optical sheet that transmits light is placed so as to cover the light guide plate, and the optical sheet is held by the protrusion section.

6. The backlight unit of claim 5, wherein a support portion is formed in the protrusion section so as to support a liquid crystal display panel that receives light from the optical sheet.

7. The backlight unit of claim 1, wherein the bottom section is at least part of a second groove in which the mounting substrate is held.

8. The backlight unit of claim 7, wherein one of opposite inner surfaces of the second groove that face each other is formed of the bottom section, and another one of the opposite inner surfaces of the second groove is formed of the wall section.

9. The backlight unit of claim 7, wherein one of the second groove is formed for one of the mounting substrate.

10. The backlight unit of claim 9, wherein there exists along a length of the second groove,
a second narrow groove width at which the second groove is in close contact with both the mounting surface and the non-mounting surface of the mounting substrate, and
a second wide groove that is wider than the second narrow groove width.

11. The backlight unit of claim 10, wherein, portions of the first second groove having the second narrow groove width are positioned corresponding at least to a middle portion and two end portions of the mounting substrate along a length of the mounting substrate.

12. The backlight unit of claim 7, wherein
the second groove has a length shorter than the length of the mounting substrate,
a plurality of second grooves are formed as the second groove with respect to the mounting substrate, and
the plurality of second grooves are positioned corresponding at least to a middle portion and two end portions of the mounting substrate along a length of the mounting substrate.

13. A liquid crystal display device, comprising:
the backlight unit of claim 1; and
a liquid crystal display panel that receives light from the backlight unit.

14. The liquid crystal display device of claim 13, wherein
an optical sheet that transmits light is placed so as to cover the light guide plate,
the optical sheet is held by the protrusion section, and
the liquid crystal display panel that receives light from the optical sheet is supported by a support portion formed in the protrusion section.

15. A backlight unit, comprising:
a light emitting block;
a mounting substrate on which the light emitting block is mounted;
a light guide plate that receives light coming from the light emitting block, the light guide plate allowing the light to pass therethrough and guiding the light to an outside thereof;
a housing in which the light emitting block, the mounting substrate, and the light guide plate are housed,
wherein the housing includes:
a bottom section that supports the light guide plate;
a wall section that rises from the bottom section; and
a protrusion section that is supported by the wall section, protrudes toward the bottom section, and extends in a direction that intersects a direction in which the wall section rises, wherein the protrusion section,
is at least part of a first groove in which the mounting substrate is held, and
includes a reflection surface that reflects light, and
includes a space formed to face at least three surfaces of the reflection surface, a light emission surface of the light emitting block, and a light reception surface of the light guide plate, wherein an angle formed by the light emission surface of the light emitting block and the reflection surface is an acute angle, and an angle formed by the light reception surface of the light guide plate and the reflection surface is an obtuse angle.

* * * * *